United States Patent
Varadarajan et al.

(10) Patent No.: US 7,831,457 B2
(45) Date of Patent: Nov. 9, 2010

(54) SYSTEM AND METHOD FOR MAXIMIZING SOFTWARE PACKAGE LICENSE UTILIZATION

(75) Inventors: Sridhar Varadarajan, Bangalore (IN); Gangadharapalli Sridhar, Bangalore (IN); Korrapati Kalyana Rao, Bangalore (IN)

(73) Assignee: Satyam Computer Services Limited of Mayfair Center, Secunderabad (IN)

( * ) Notice: Subject to any disclaimer, the term of this patent is extended or adjusted under 35 U.S.C. 154(b) by 1692 days.

(21) Appl. No.: 10/462,812

(22) Filed: Jun. 17, 2003

(65) Prior Publication Data

US 2004/0260589 A1    Dec. 23, 2004

(51) Int. Cl.
G05B 19/418 (2006.01)
G06F 9/46 (2006.01)

(52) U.S. Cl. ............................. 705/8; 705/1.1; 705/7; 705/10; 705/53; 705/59

(58) Field of Classification Search ....................... 705/8
See application file for complete search history.

(56) References Cited

U.S. PATENT DOCUMENTS

| | | | |
|---|---|---|---|
| 5,623,404 A * | 4/1997 | Collins et al. .................. 705/9 |
| 5,742,757 A | 4/1998 | Hamadani et al. | |
| 5,745,879 A | 4/1998 | Wyman et al. | |
| 6,502,079 B1 | 12/2002 | Ball et al. | |
| 6,567,784 B2 * | 5/2003 | Bukow .......................... 705/9 |
| 6,571,158 B2 * | 5/2003 | Sinex ........................... 701/29 |
| 7,197,466 B1 * | 3/2007 | Peterson et al. ................. 705/1 |
| 2002/0022971 A1 * | 2/2002 | Tanaka et al. .................. 705/1 |
| 2002/0169725 A1 * | 11/2002 | Eng ............................. 705/59 |
| 2003/0115094 A1 * | 6/2003 | Ammerman et al. .......... 705/11 |
| 2004/0010440 A1 * | 1/2004 | Lenard et al. ................. 705/10 |
| 2004/0054630 A1 * | 3/2004 | Ginter et al. ................... 705/53 |
| 2004/0167859 A1 * | 8/2004 | Mirabella ..................... 705/59 |
| 2005/0049973 A1 * | 3/2005 | Read et al. .................... 705/59 |
| 2006/0235732 A1 * | 10/2006 | Miller et al. .................... 705/7 |
| 2006/0293942 A1 * | 12/2006 | Chaddha et al. ................ 705/8 |

* cited by examiner

*Primary Examiner*—Romain Jeanty
*Assistant Examiner*—Jaime Cardenas-Navia
(74) *Attorney, Agent, or Firm*—Merek, Blackmon & Voorhees, LLC

(57) ABSTRACT

Enterprises procure a large number of licenses of a large number of software packages. Software package inventory is one of the high cost items in these enterprises. It is necessary to contain this recurring expenditure on software packages by optimally utilizing the procured licenses. Disclosed is a system and method for maximizing software package license utilization. The system includes components for enabling managers of an enterprise to describe their need for software packages in project plans and users to use the software packages based on such plans. Further, the system also manages unplanned demands to use software packages and maintains a near-optimal inventory of licenses of software packages.

4 Claims, 20 Drawing Sheets

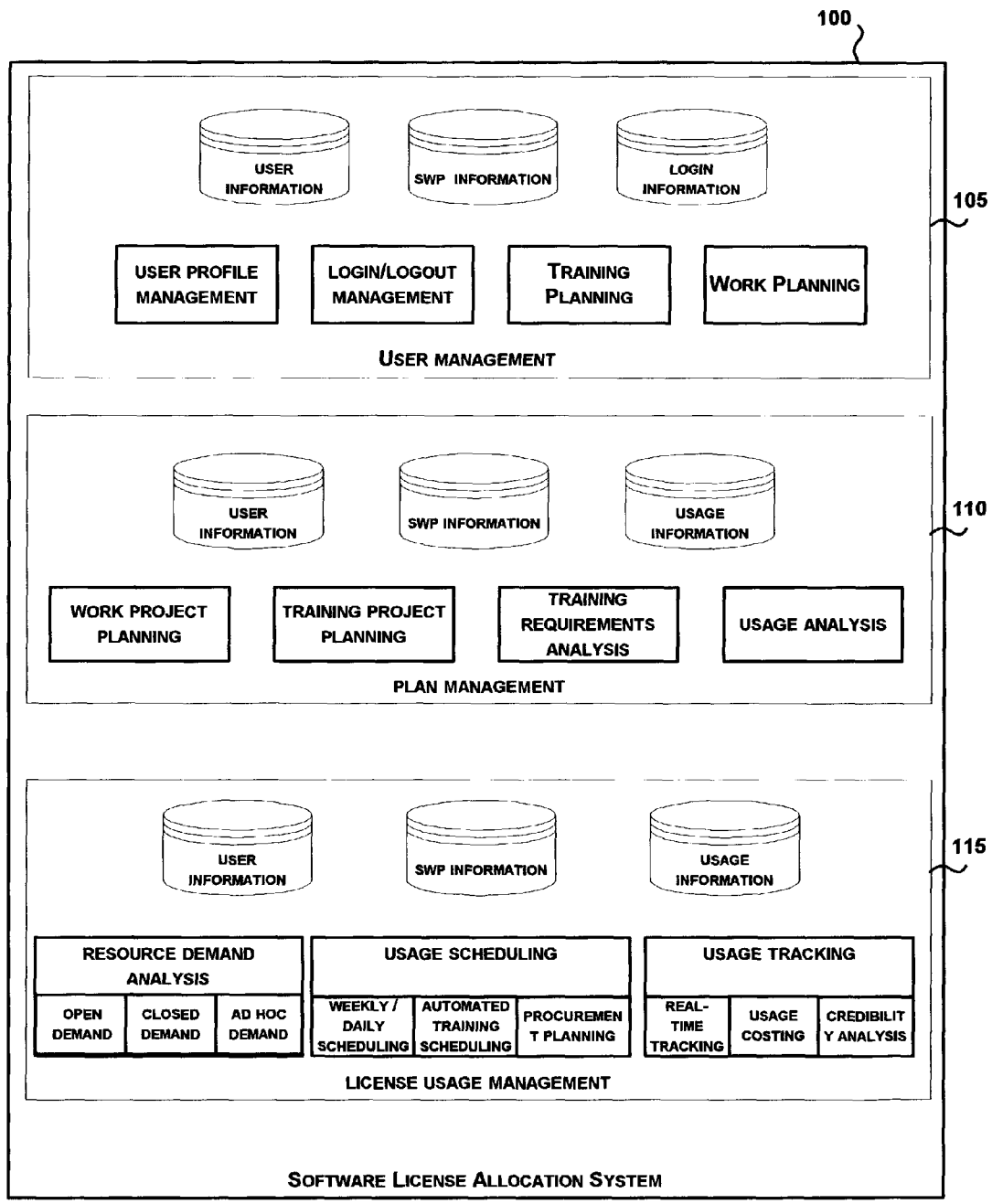
FIG. 1: SLAS SYSTEM ARCHITECTURE

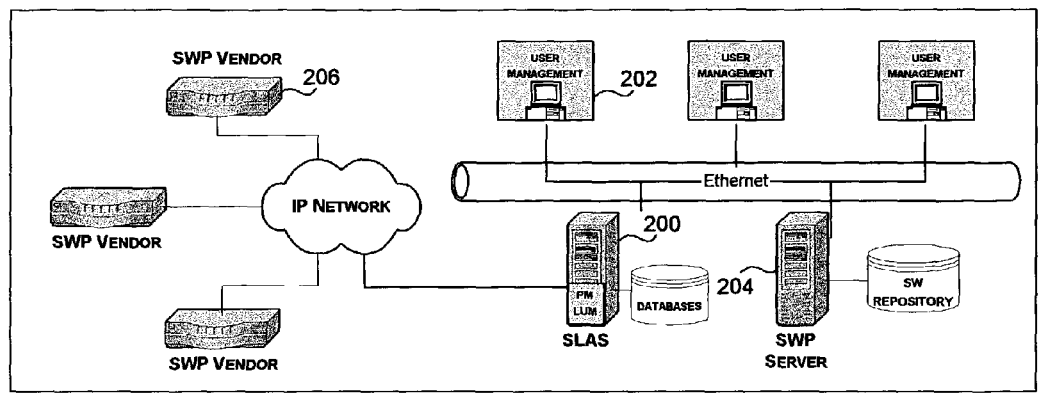
FIG. 2: SLAS NETWORK ARCHITECTURE
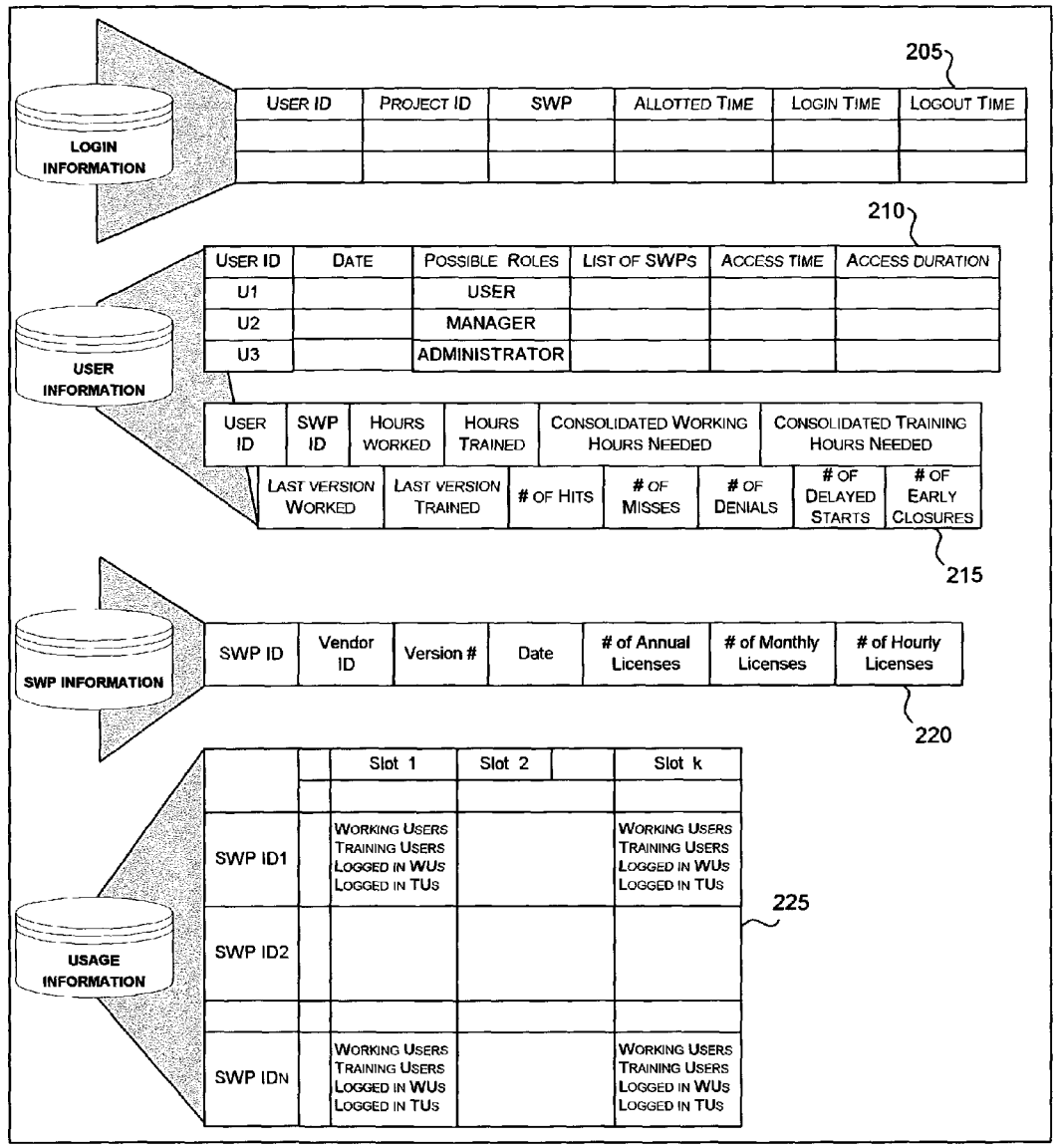
FIG. 2A: SLAS DATABASE TABLES

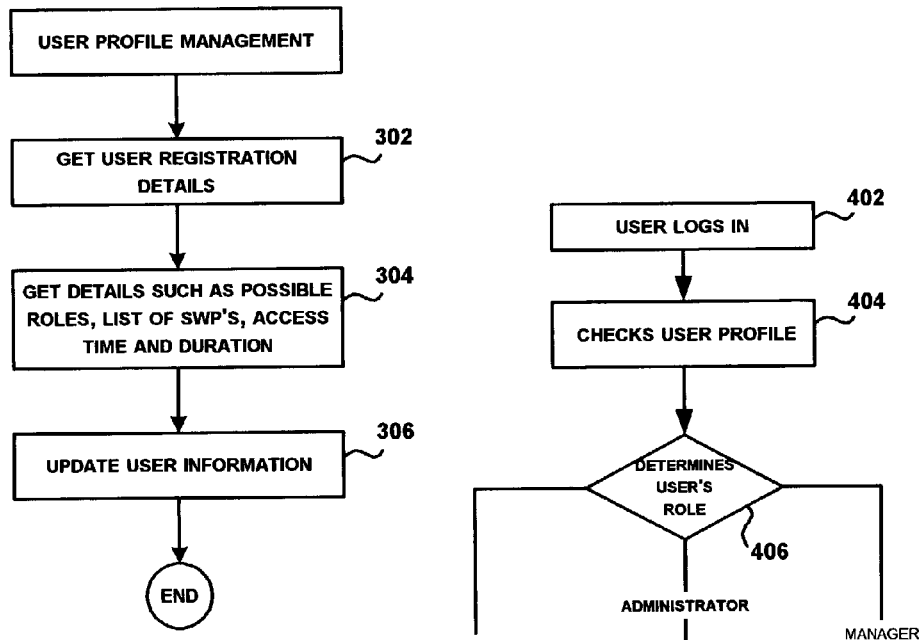
FIG. 3: USER PROFILE MANAGEMENT
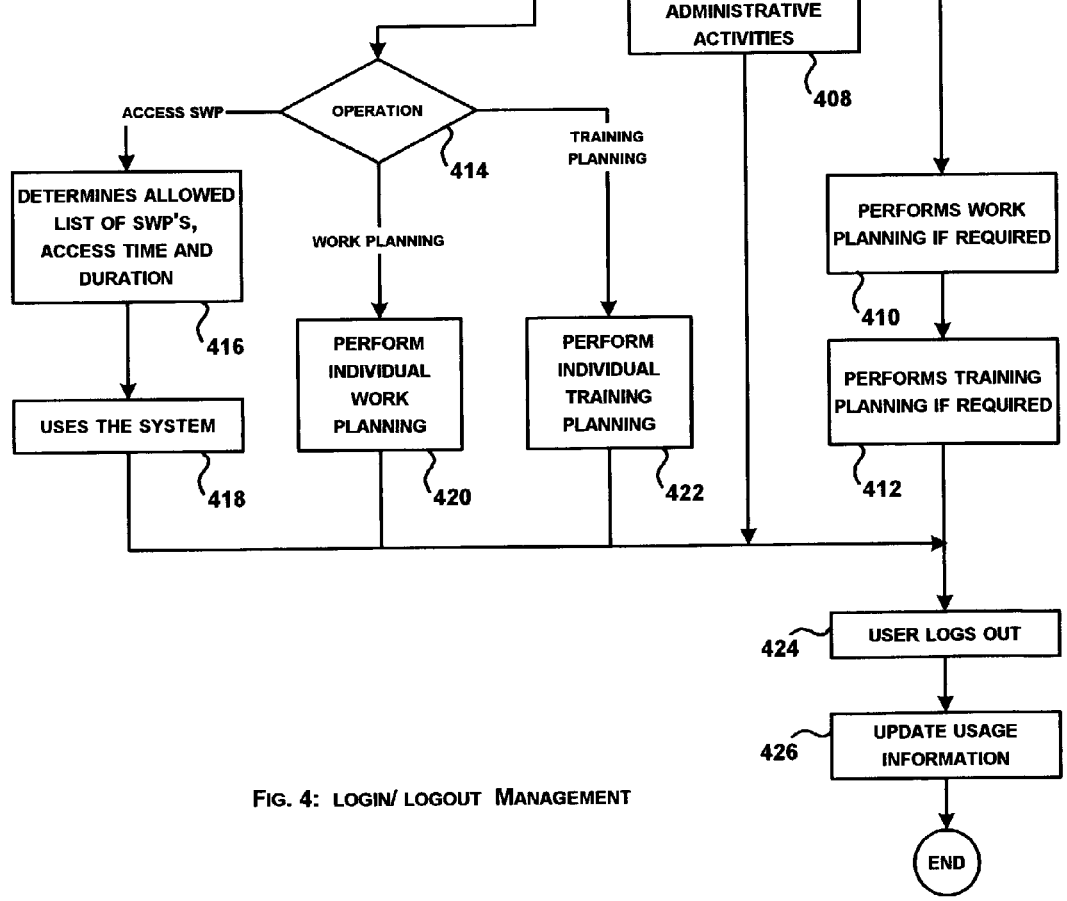
FIG. 4: LOGIN/ LOGOUT MANAGEMENT

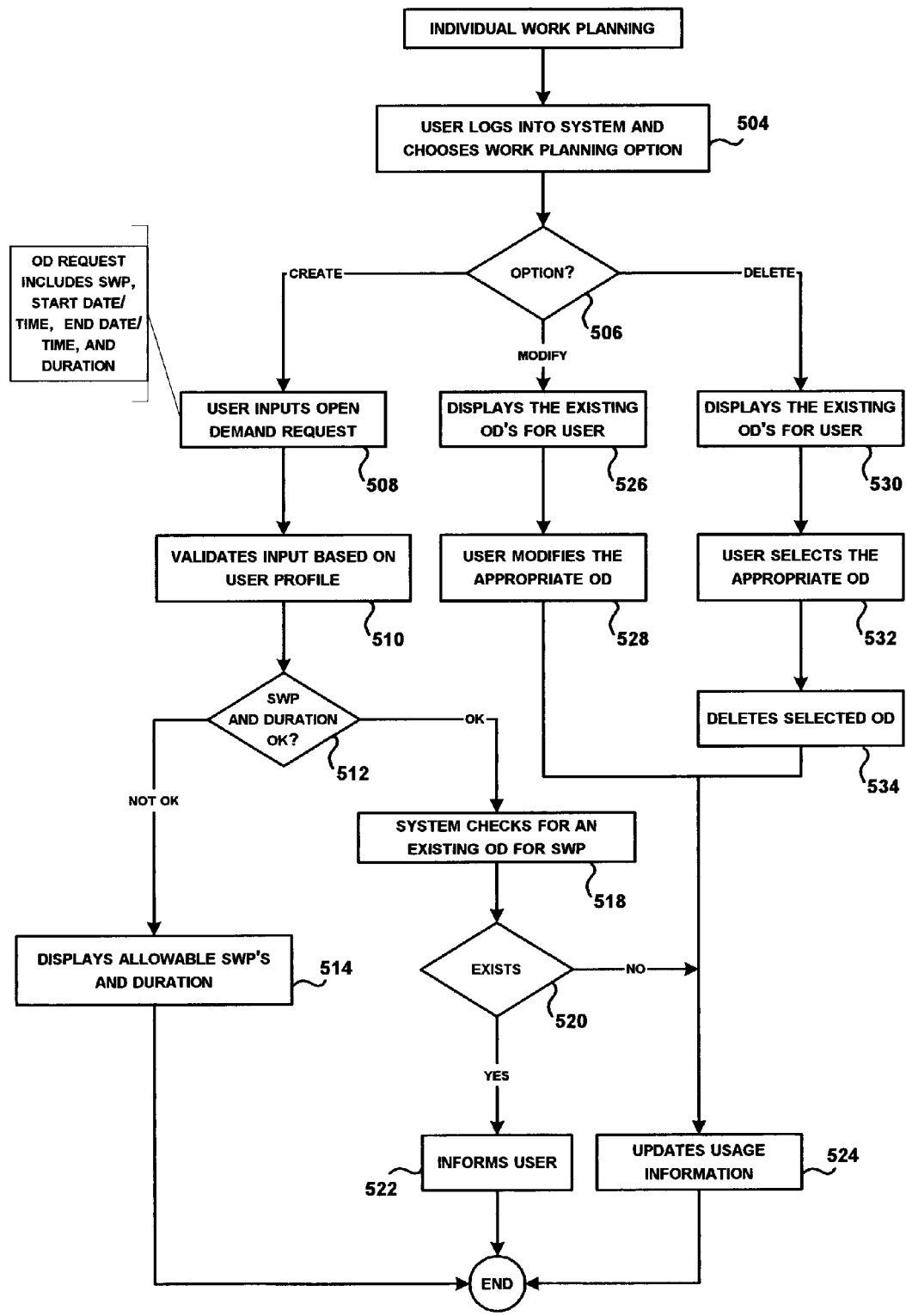
FIG. 5: INDIVIDUAL WORK PLANNING

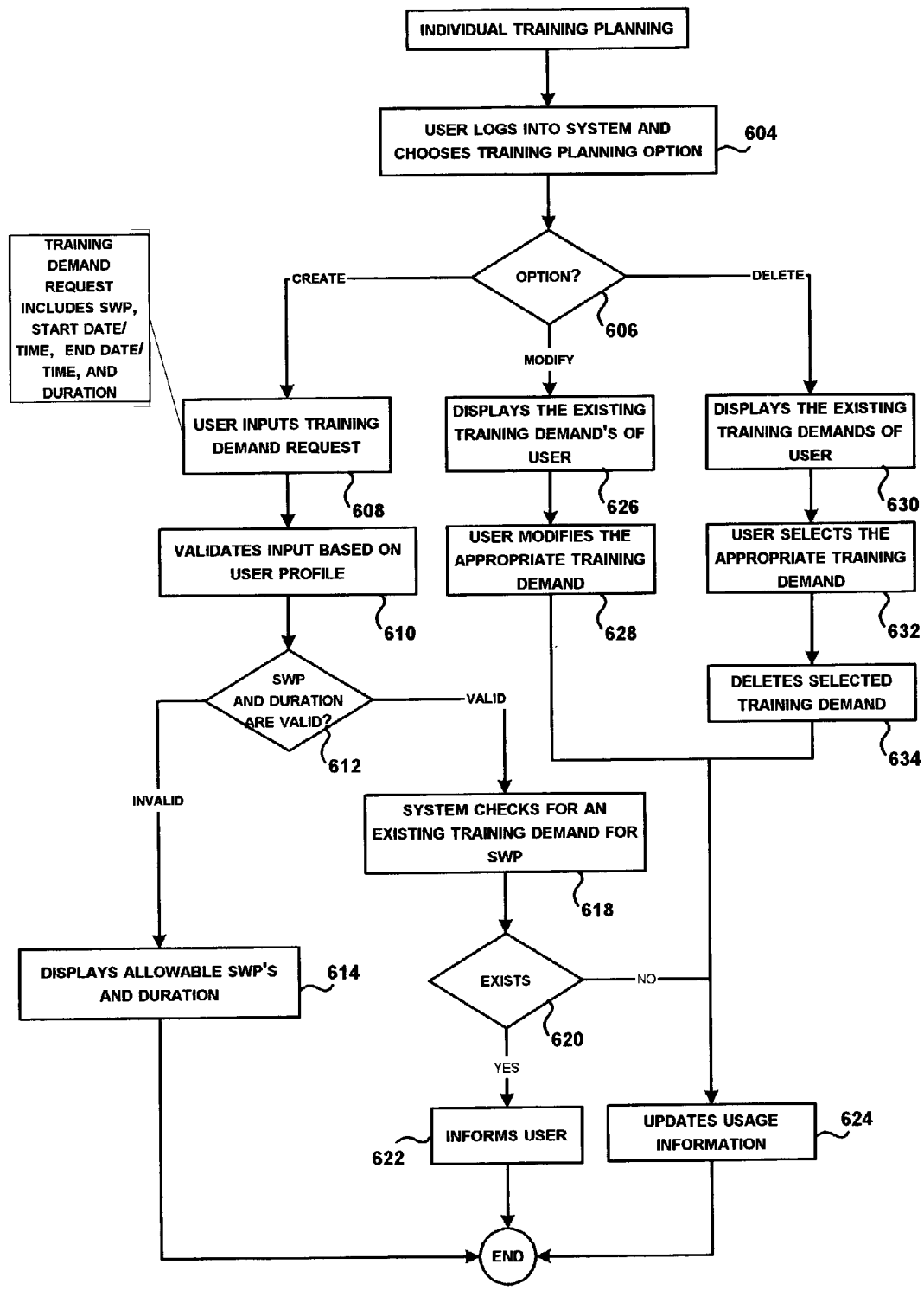
FIG. 6: INDIVIDUAL TRAINING PLANNING

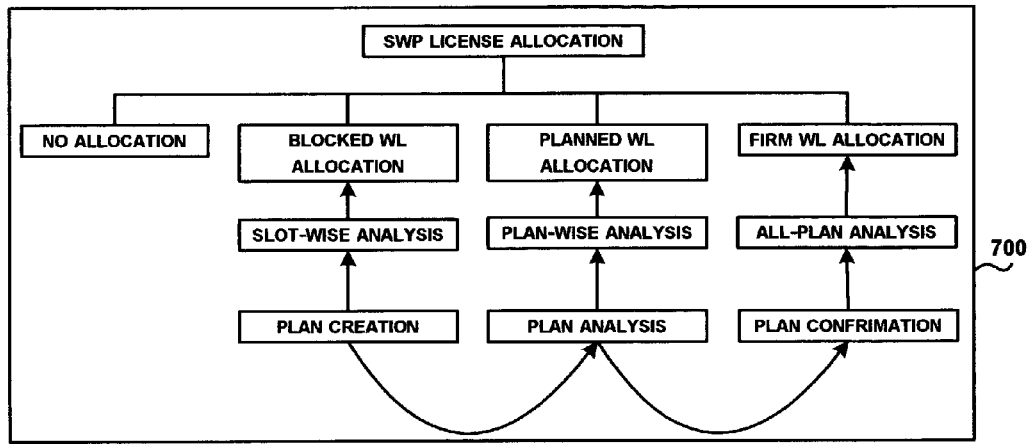
FIG. 7: PHASES OF WORK PLANNING
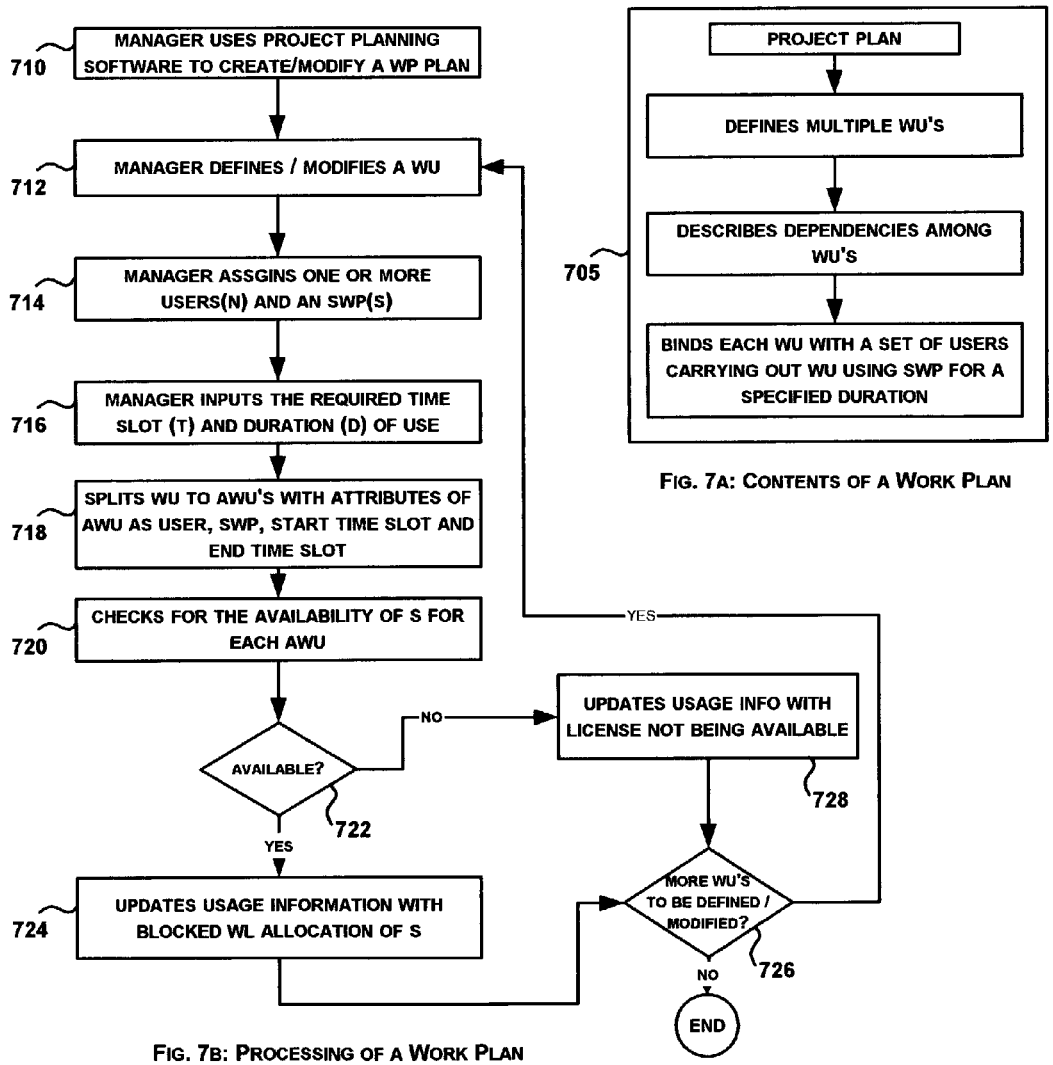
FIG. 7B: PROCESSING OF A WORK PLAN

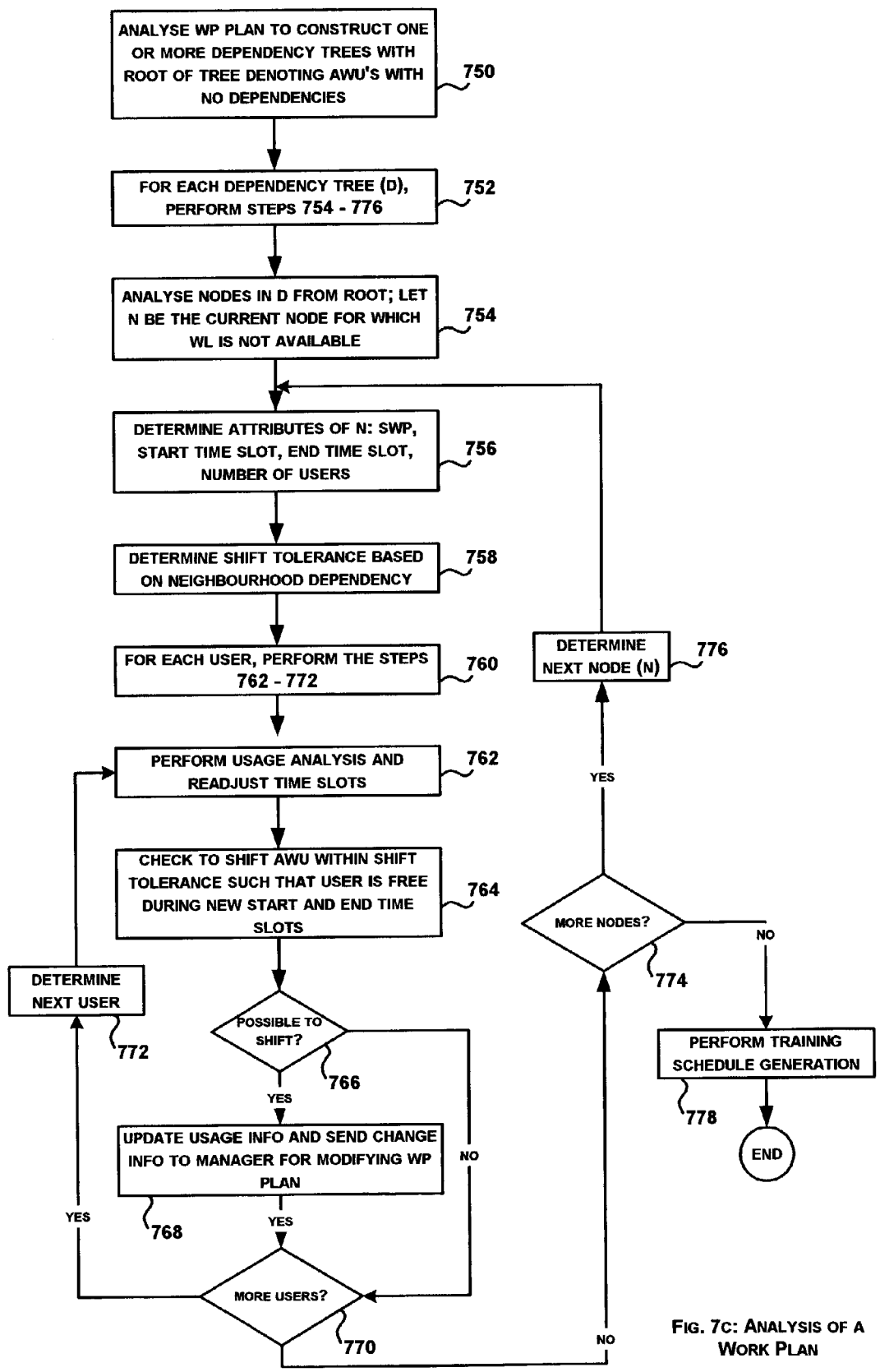
FIG. 7C: ANALYSIS OF A WORK PLAN

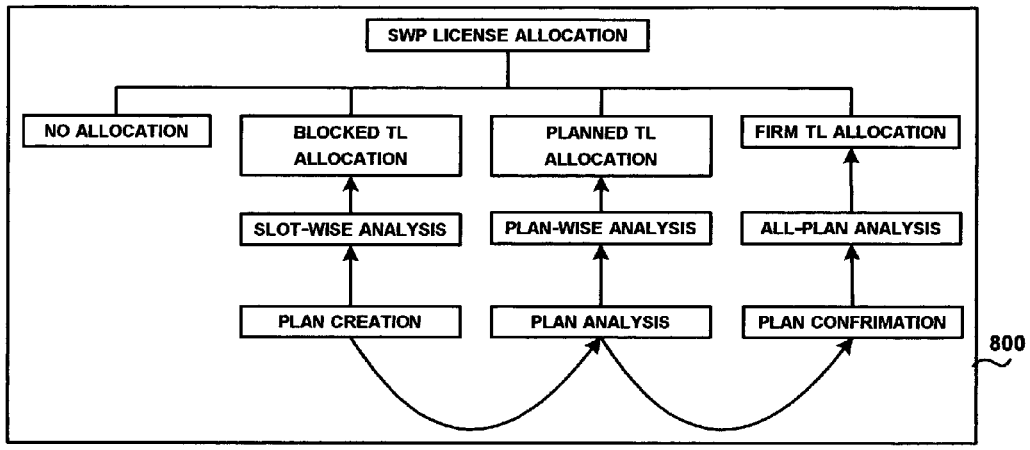
FIG. 8: PHASES OF TRAINING PLANNING
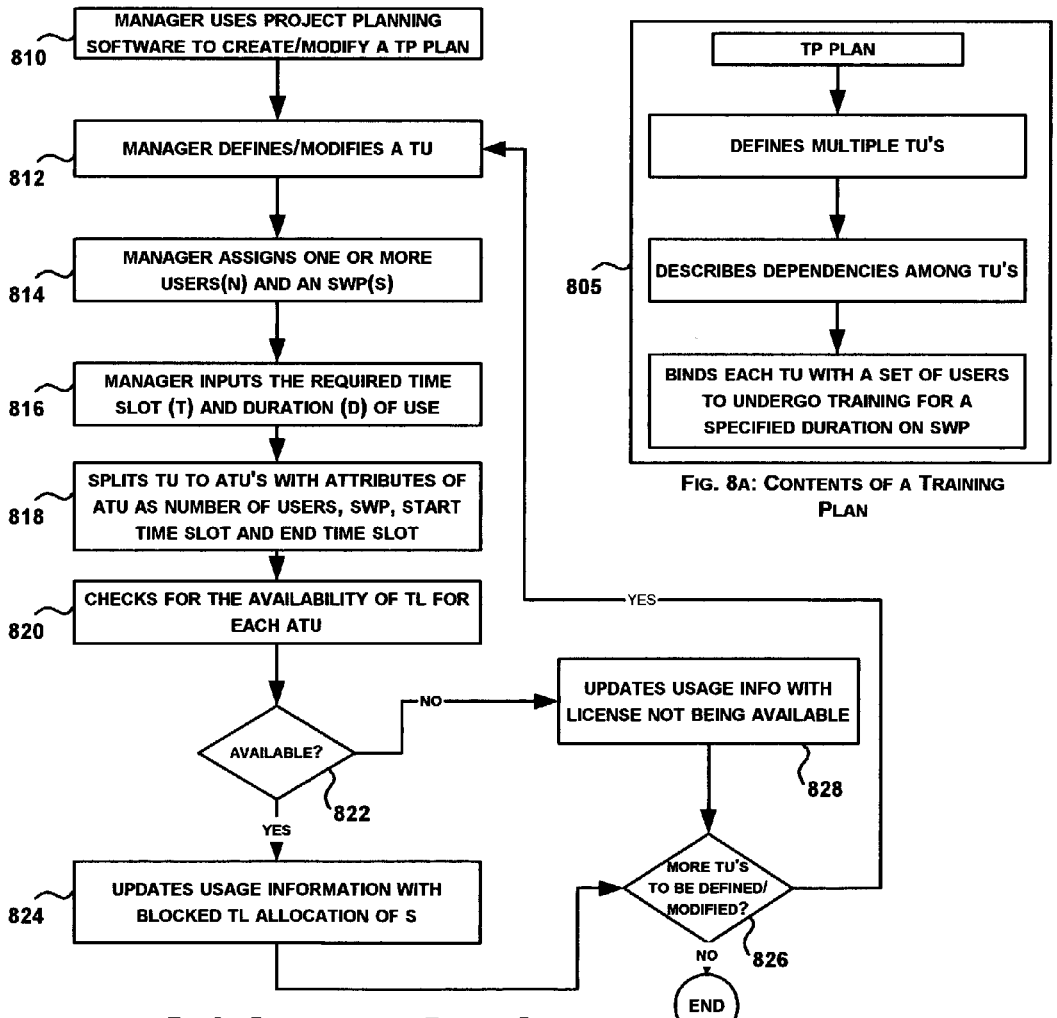
FIG. 8A: CONTENTS OF A TRAINING PLAN
FIG. 8B: PROCESSING OF A TRAINING PLAN

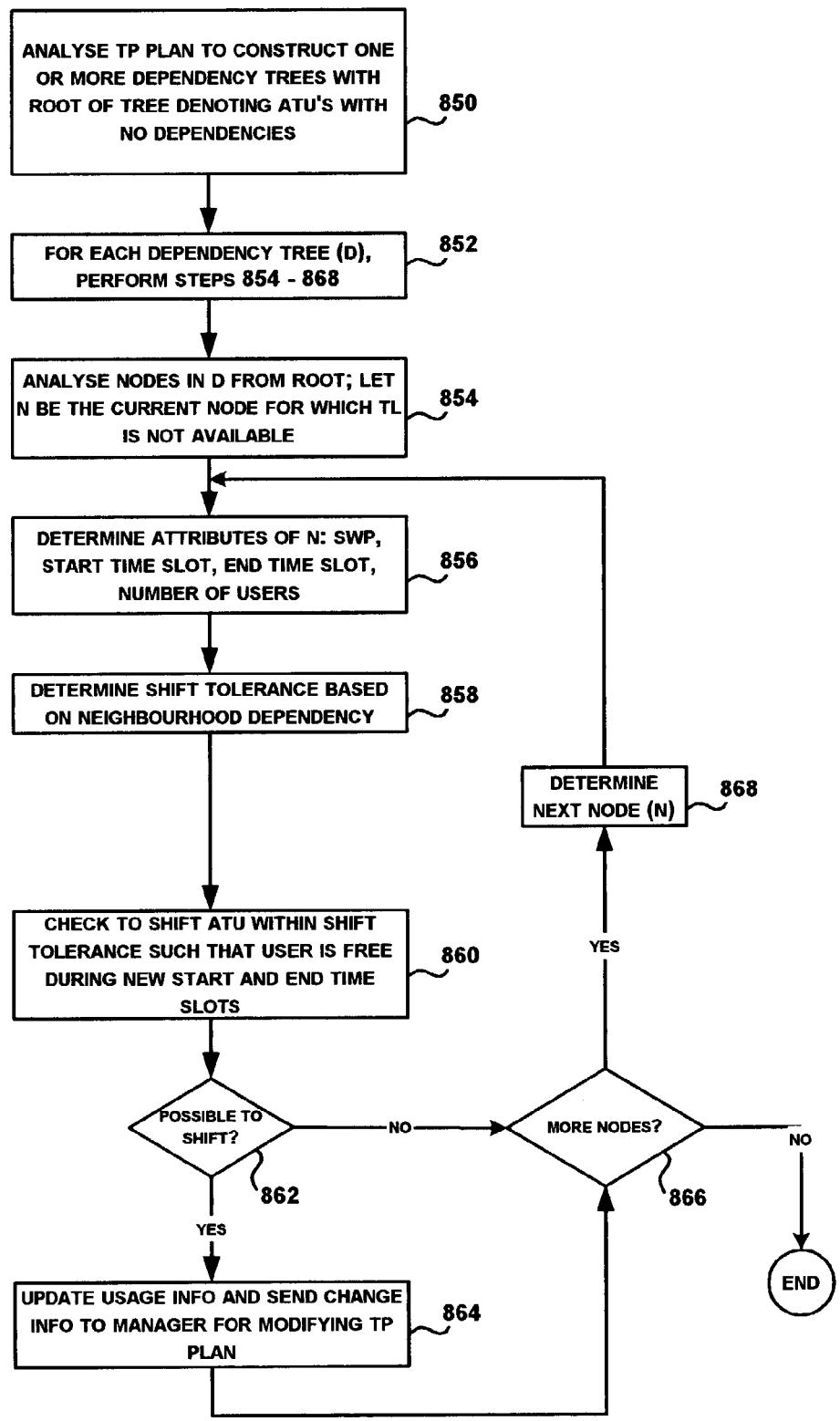
FIG. 8C: ANALYSIS OF A TRAINING PLAN

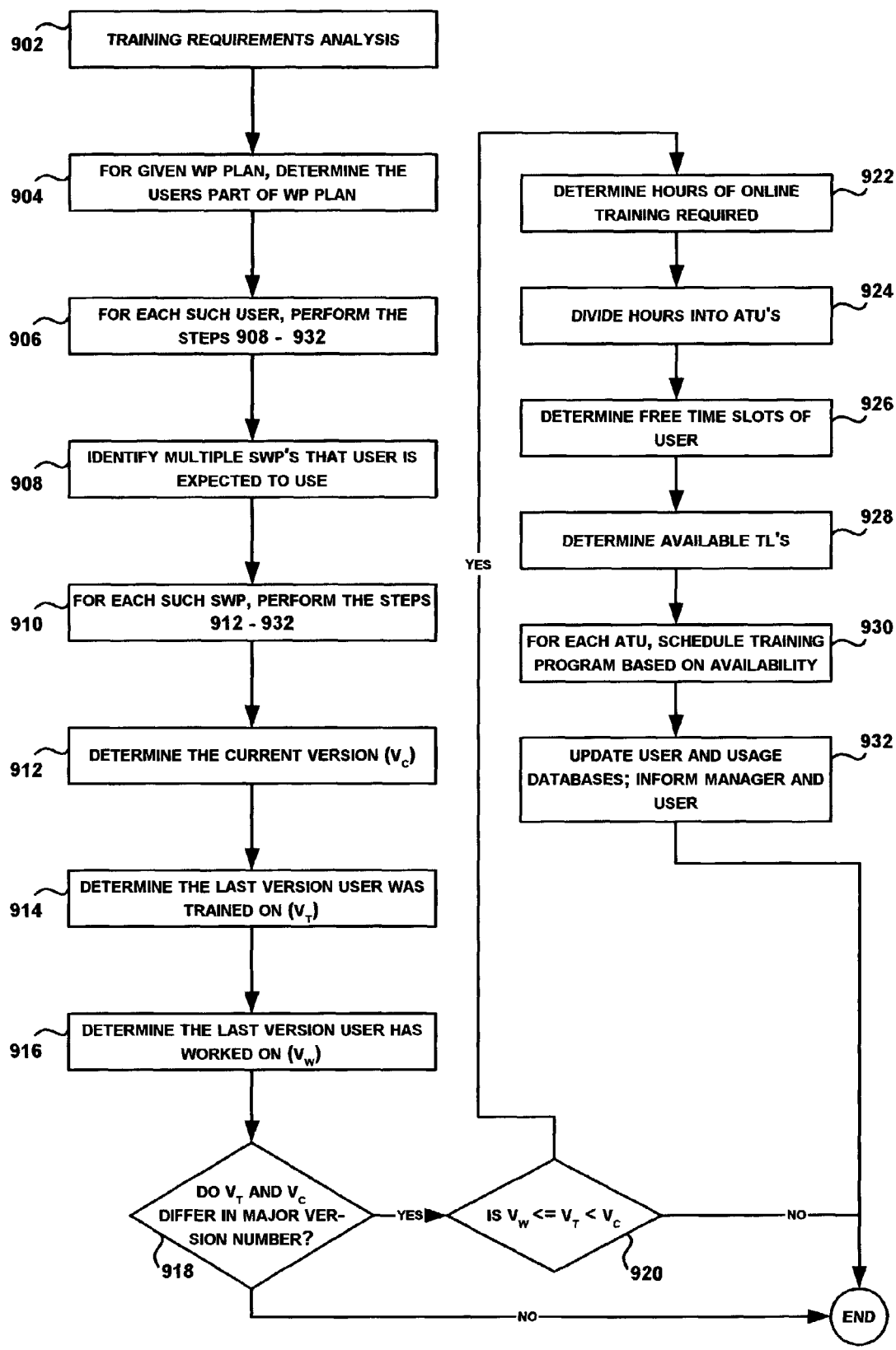
FIG. 9: ANALYSIS OF TRAINING REQUIREMENTS

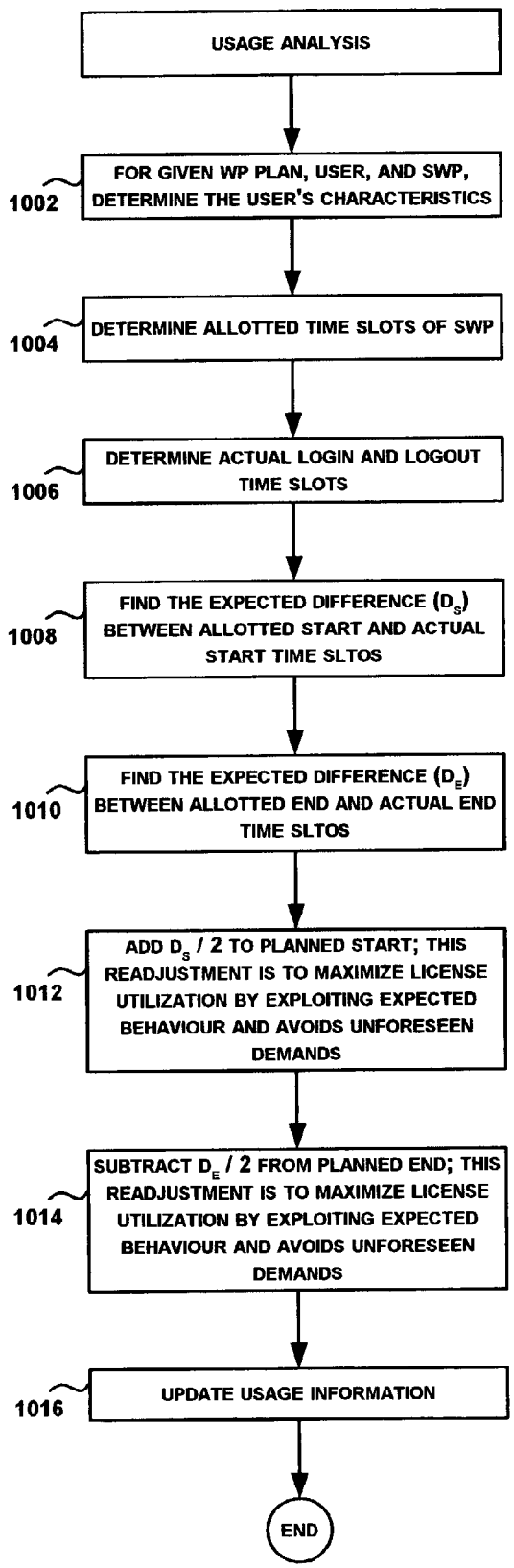
FIG. 10: USAGE ANALYSIS

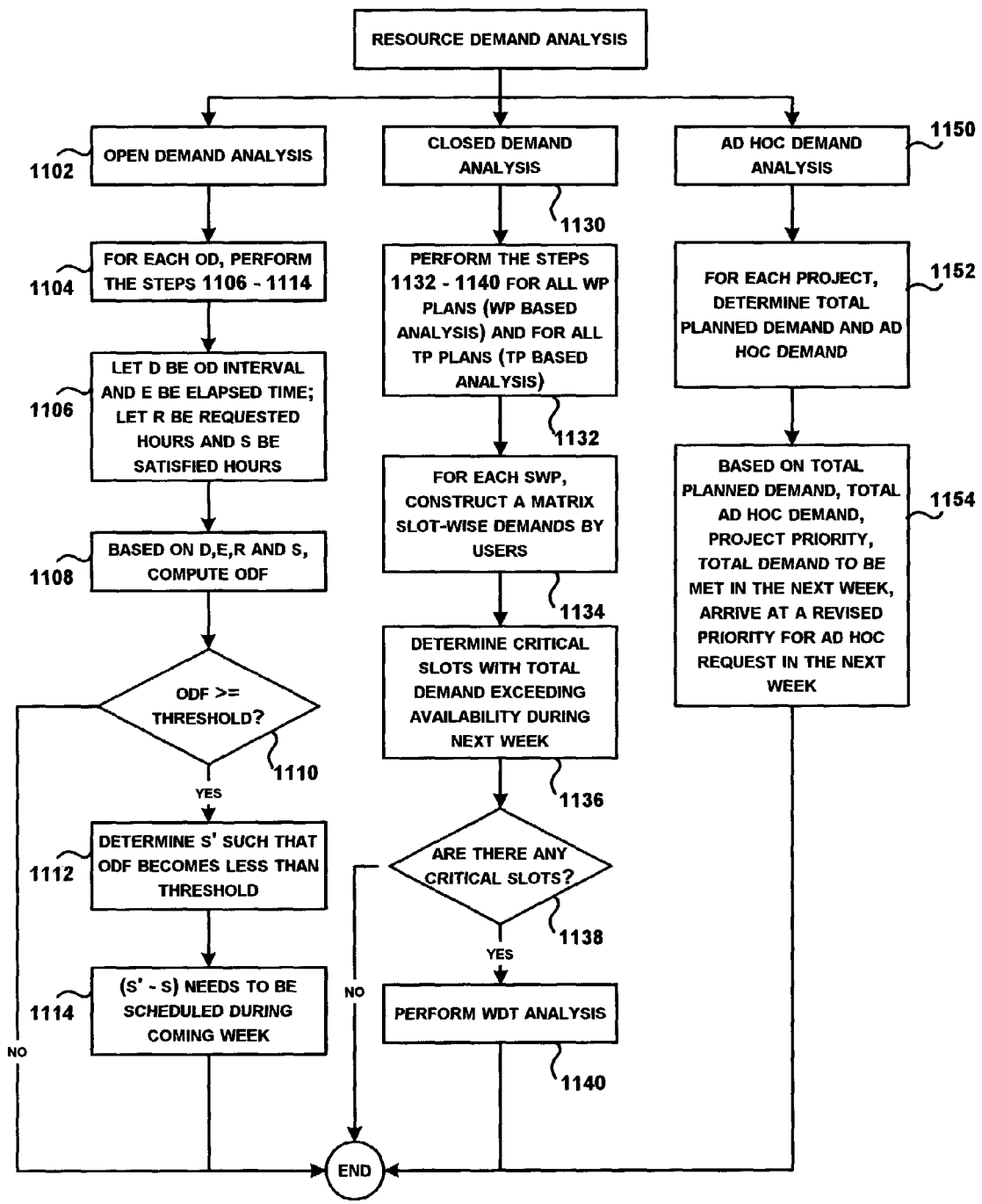
FIG. 11: RESOURCE DEMAND ANALYSIS

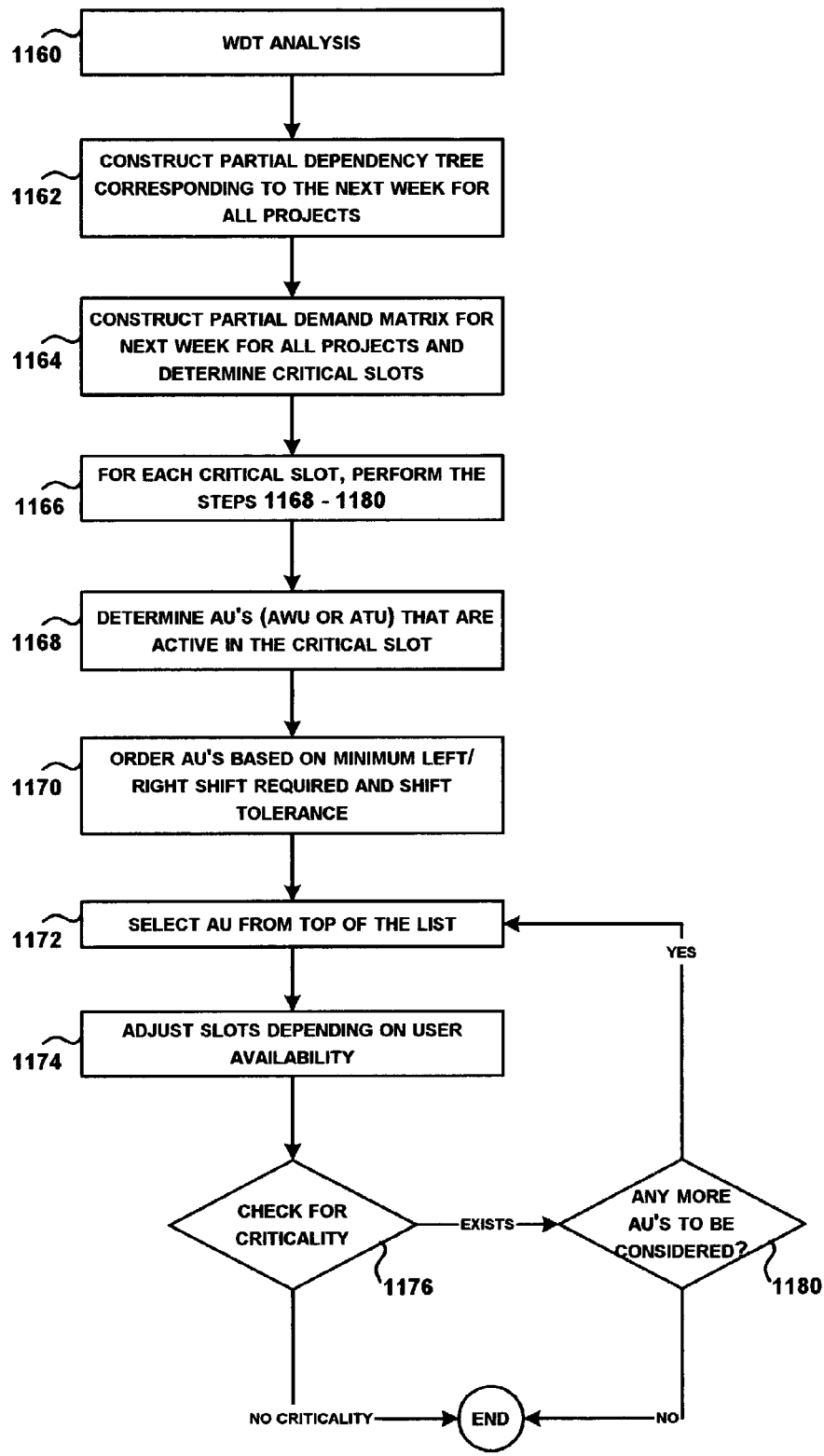
FIG. 11A: DEPENDENCY TREE ANALYSIS

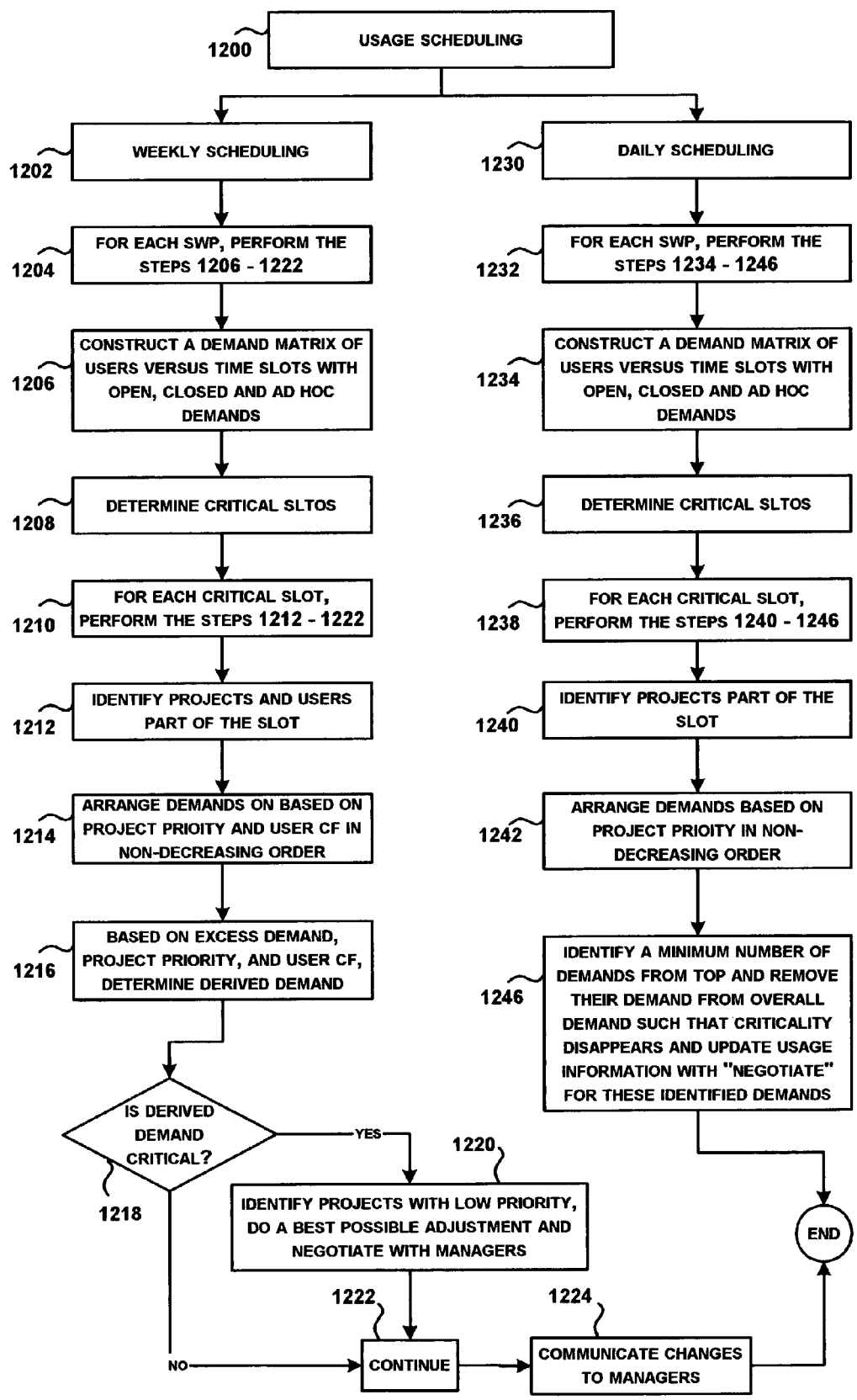
FIG. 12: WEEKLY AND DAILY SCHEDULING

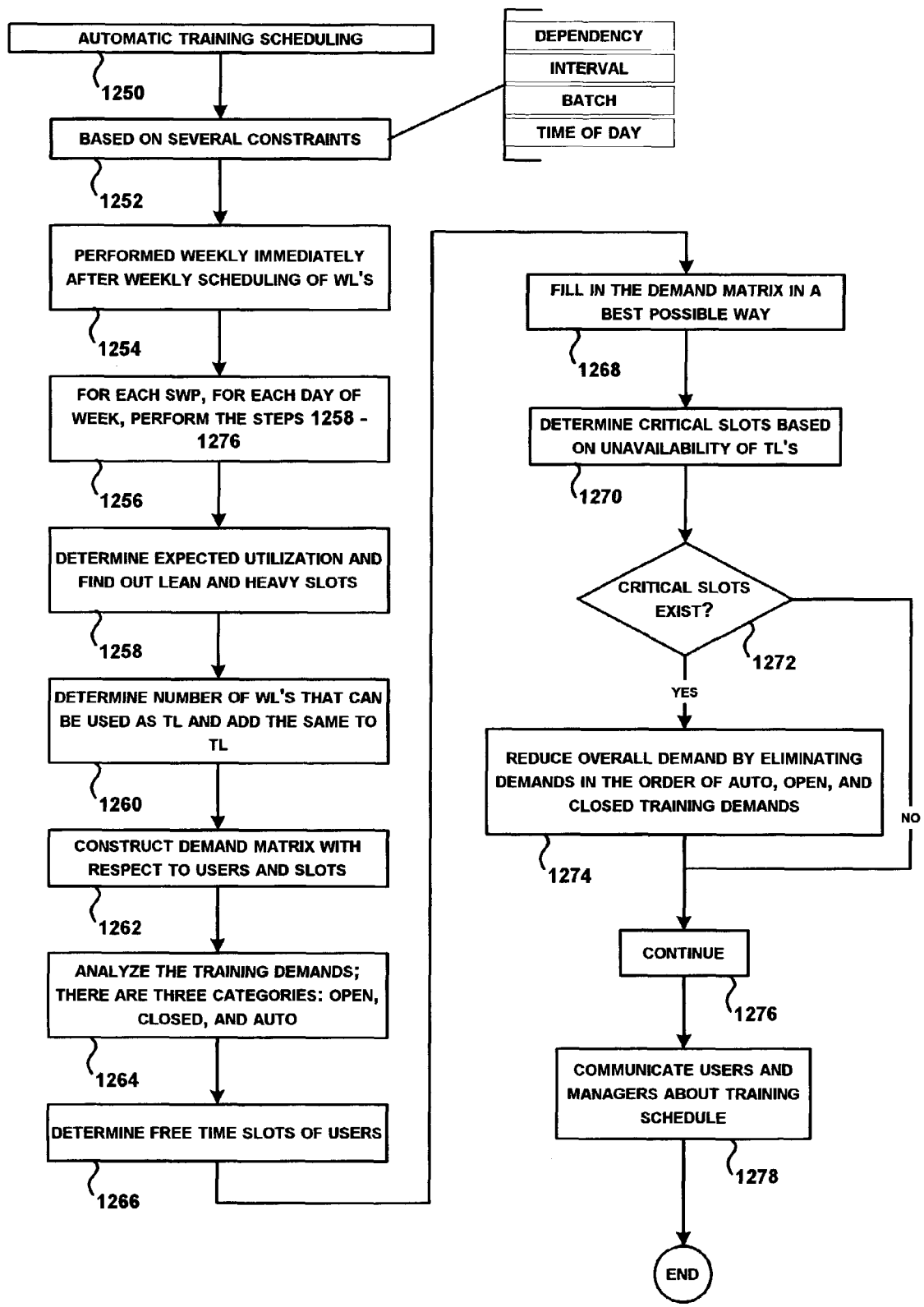
FIG. 12A: AUTOMATIC TRAINING SCHEDULING

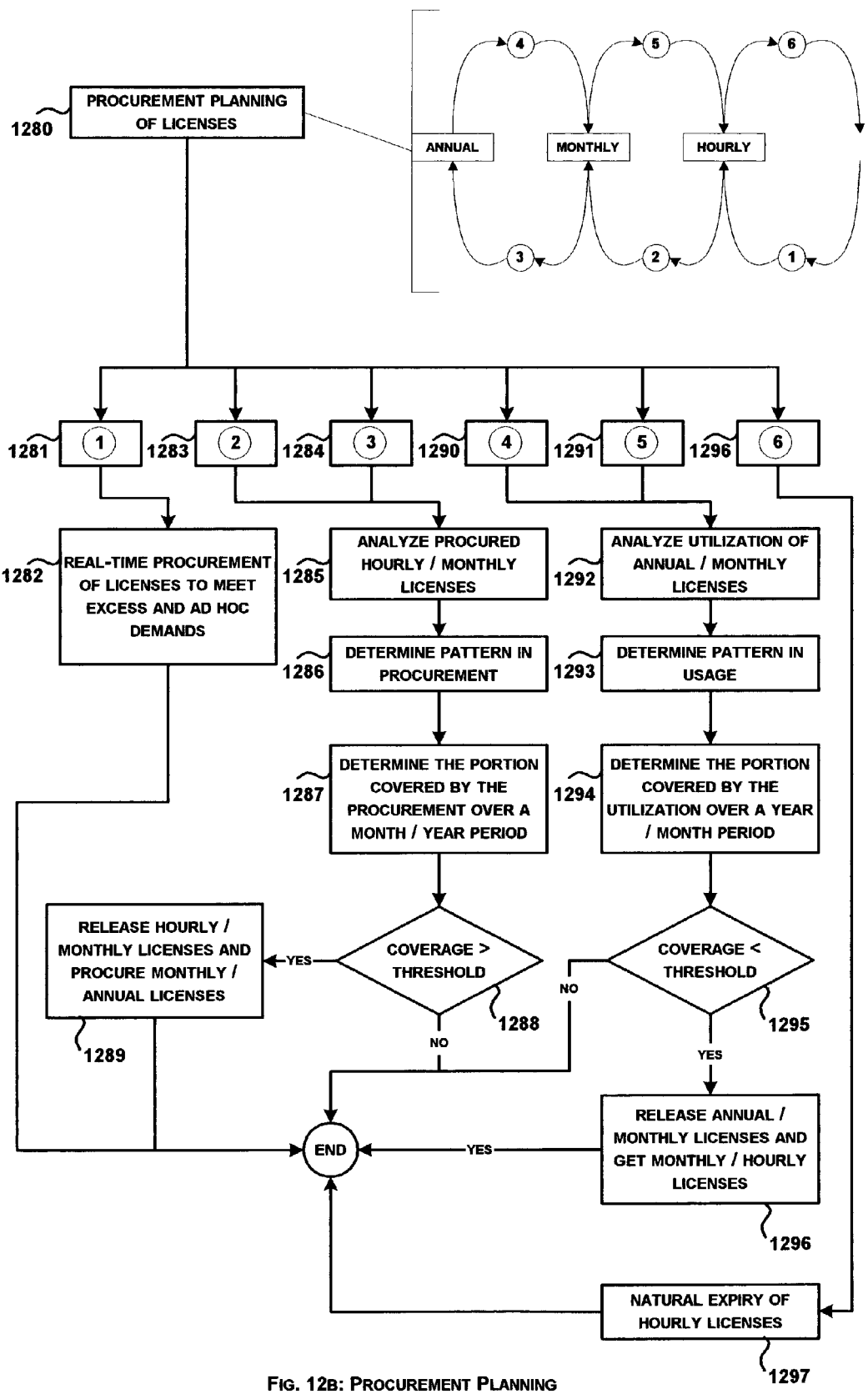
FIG. 12B: PROCUREMENT PLANNING

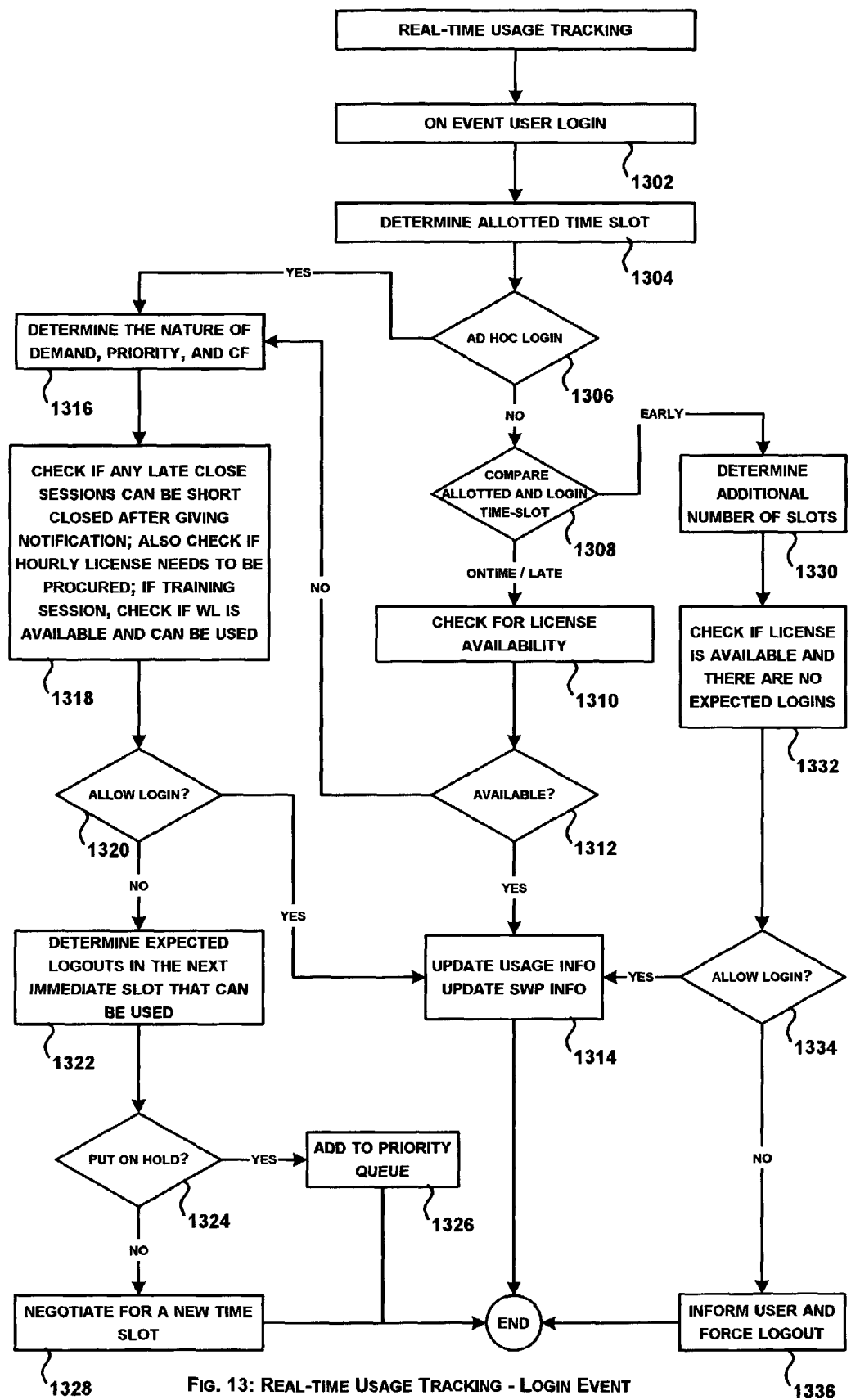
FIG. 13: REAL-TIME USAGE TRACKING - LOGIN EVENT

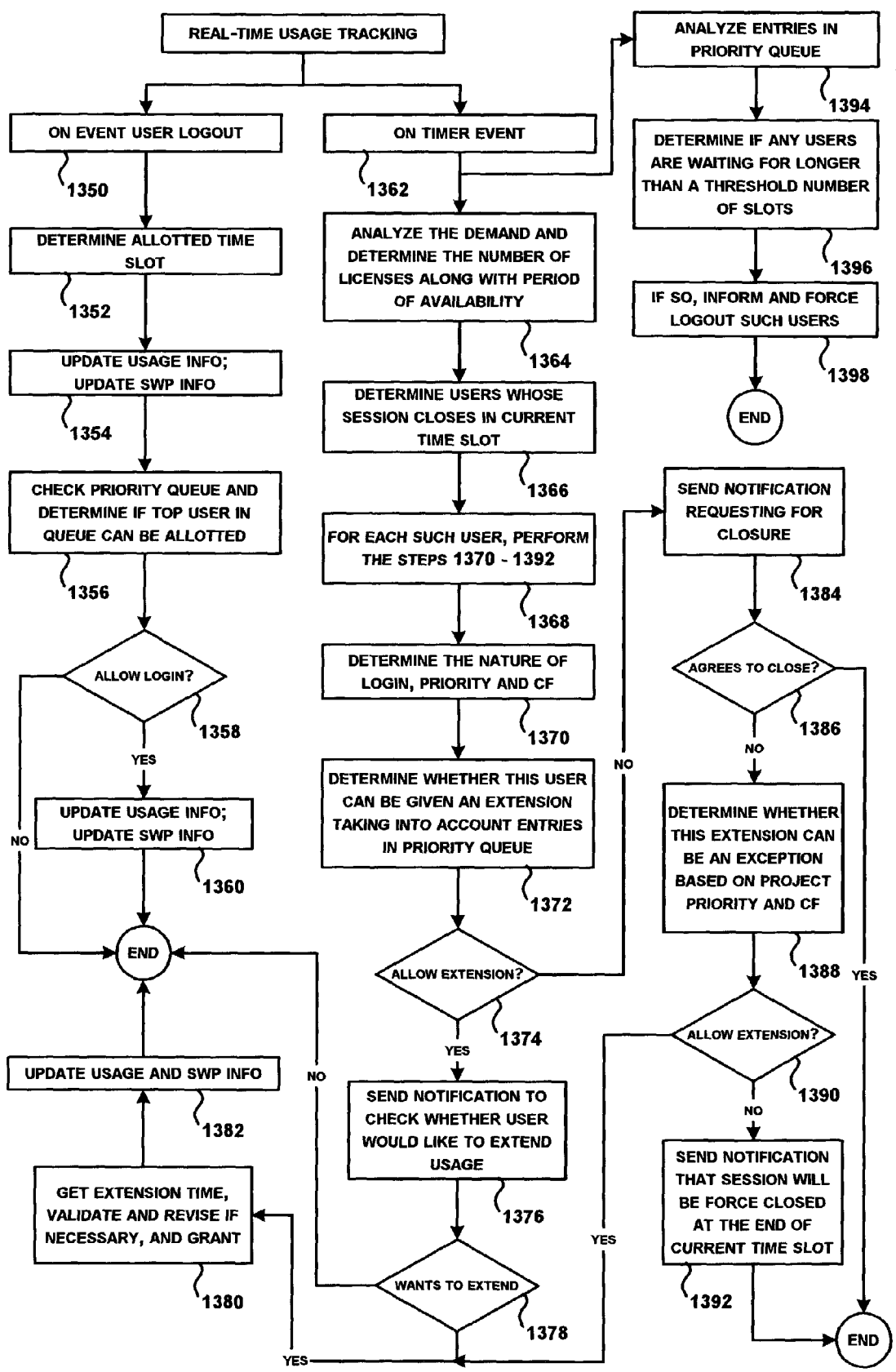
FIG. 13A: REAL-TIME USAGE TRACKING - LOGOUT AND TIMER EVENTS

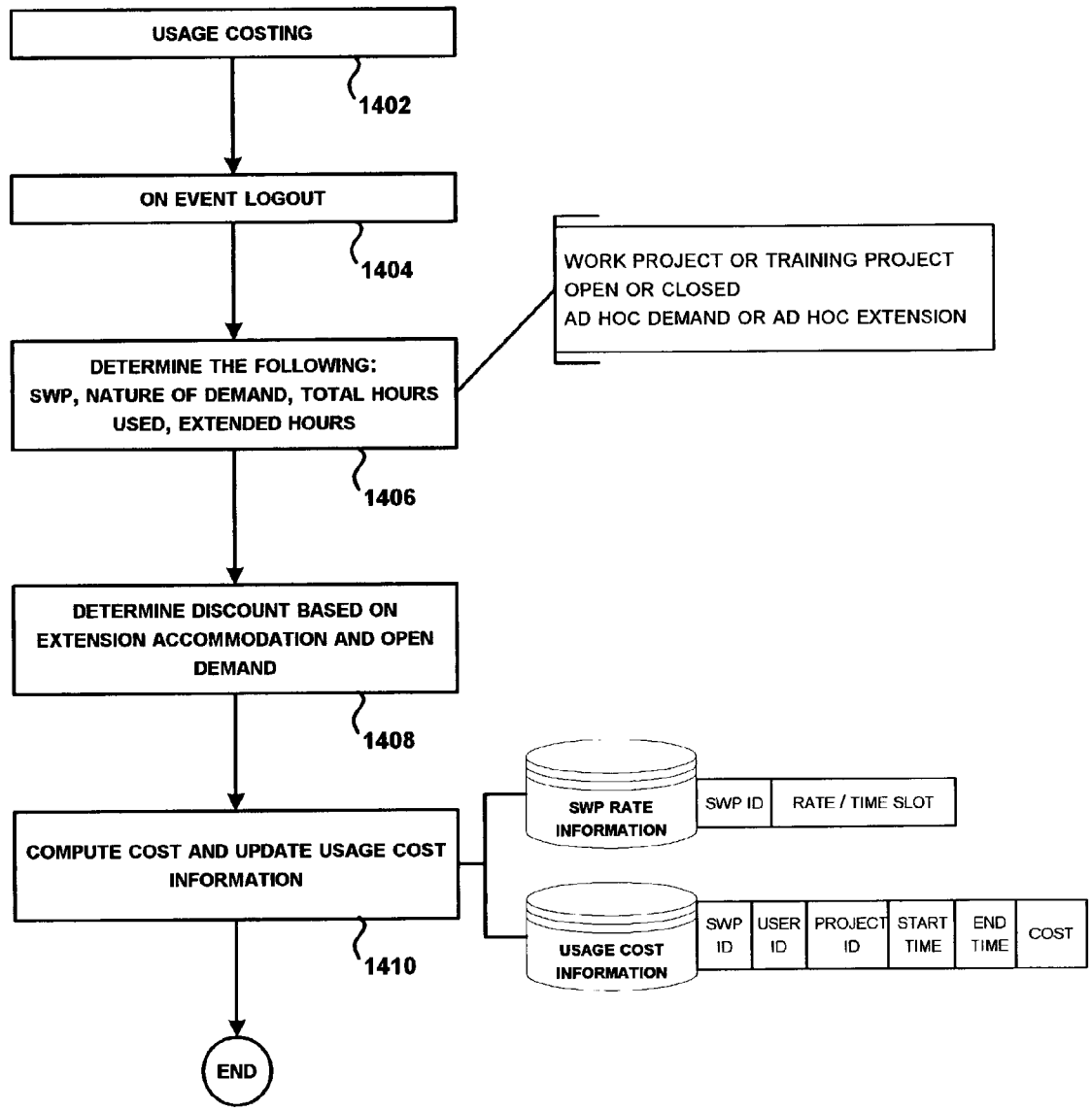
FIG. 14: USAGE COSTING

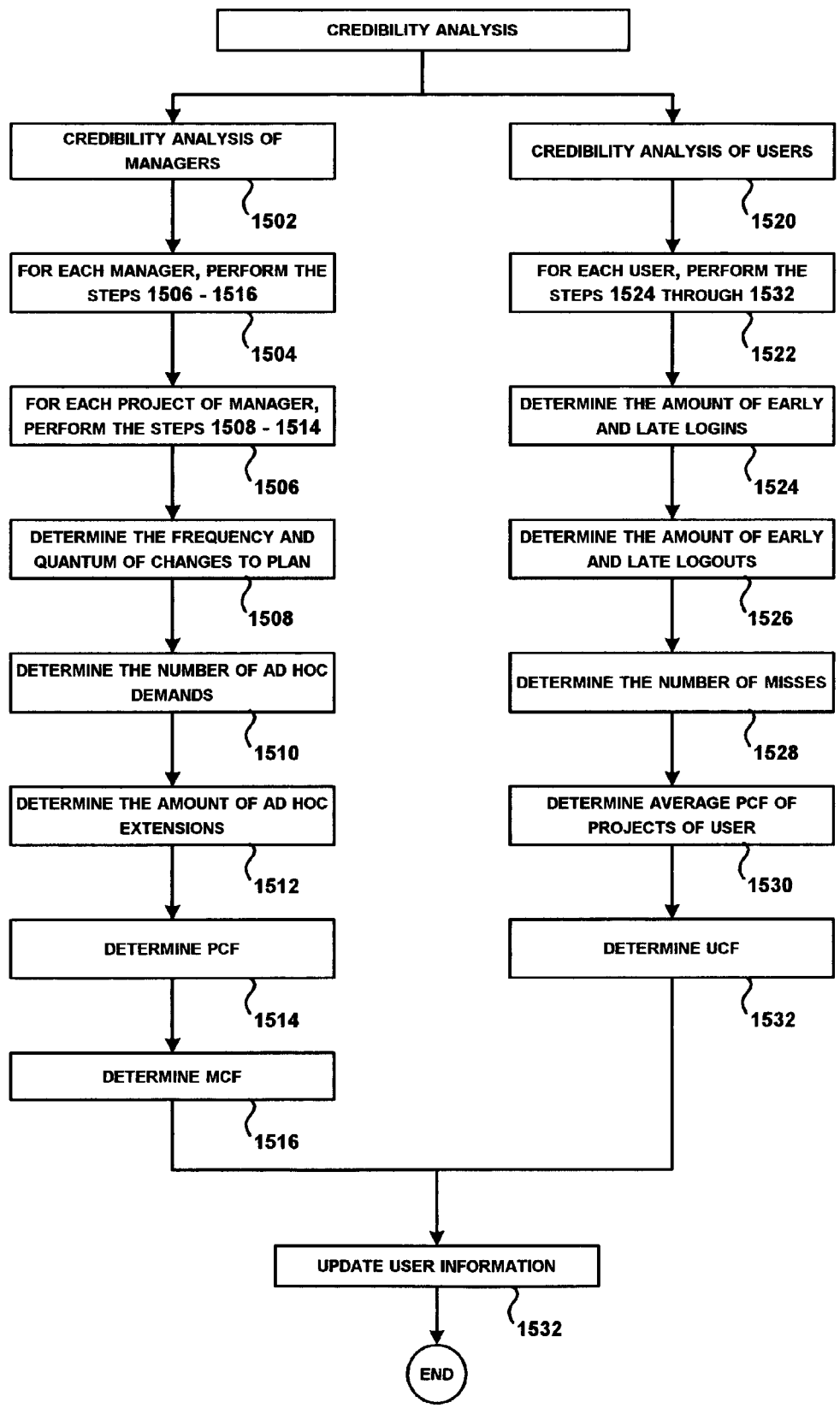
FIG. 15: CREDIBILITY ANALYSIS

SYSTEM AND METHOD FOR MAXIMIZING SOFTWARE PACKAGE LICENSE UTILIZATION

FIELD OF THE INVENTION

The present invention relates to software package licenses in general, and more particularly, maximizing utilization of licenses of software packages. Still more particularly, the present invention relates to a system and method for maximizing software package license utilization by a near-optimal distribution of demands to use software packages.

BACKGROUND OF THE INVENTION

Software license management for optimum utilization in an enterprise has always been a challenging task. Typically an enterprise holds usage licenses for several SWPs which are used by multiple users at different times. The validity of these licenses can typically be one or more hours, one or more days, one or more months, or one or more years. These licenses are maintained on a central server that enforces licensing requirements based on demand from users. A software package can be used by a user for work purposes or for training purposes. In a large enterprise where, at any given time, several users demand for using an SWP, a good handling and distribution of demands with effective planning can maximize the utilization of licenses. Most of the work related demands that are based on a project plan are firm and many times non-negotiable. Also, it is necessary to address ad hoc and unplanned demands as well. Allocation of licenses of SWPs which is based on an in-depth analysis of project schedules will go long way in meeting the dual objectives of optimum license utilization and effective project management.

DESCRIPTION OF RELATED ART

U.S. Pat. No. 5,745,879 to Wyman and Robert M; for "Method and system for managing execution of licensed programs" (issued on Apr. 28, 1998) describes a license management system to account for software product usage, and is aimed at controlling the access to license and accounting the usage of each software license. The system also aids in formulating license utilization policy by providing reports on utilization of each license.

U.S. Pat. No. 5,742,757 to Hamadani; Mehrdad; and Huffman; Ward; for "Automatic software license manager" (issued on Apr. 21, 1998) describes a software license management system that facilitates a user at a local node of a computer network in selecting an appropriate type of software licenses available at the time of a request. In response to the user's request for a license of a required software tool, the system first checks whether a node-locked license assigned to the user node is available. If no such license is available, the system determines whether a floating license for the required software tool is available. In the absence of such a floating license or local node-locked license, the system finds out whether a node-locked license assigned to a remote node of the network can be used. In that case, the user is connected to the remote node to use that node-locked license. If no license for the required software tool is available at the time of the request, the system maintains a license request queue for the required software tool. The user is notified when any license for the required software tool becomes available in the order of queue.

U.S. Pat. No. 6,502,079 to Ball; Scott Richard et. al for "Method and system for enforcing floating licenses" (issued on Dec. 31, 2002) describes a system and an enforcement method for floating licenses, which enables an authorized user to accumulate time-based usage credit while a software application is in use under a valid license. This system provides a method for making the application to remain accessible to the user even in the event of a license system fault, by consuming the usage credit that was previously accumulated. If the license system fault is corrected before all of the accumulated usage credits is consumed, the application remains accessible to the user under the valid license and resumes accumulating usage credit. By this, the system provides the user with un-interrupted application usage and at the same time prevents excessive unauthorized use of the application, thereby protecting the rights of the software vendor.

The known systems do not address the issue of effective utilization of the licenses in a large enterprise by proactive analysis of project schedules and license requirements of software packages. The present invention provides a system that proactively analyses the needs of software licenses for the purposes of usage and training on software packages in a large enterprise and ensures that all of planned and unplanned needs are met and, simultaneously, maximizes the utilization of licenses.

SUMMARY OF THE INVENTION

Managing the utilization of licenses of SWPs is essential to lower the SWP inventory cost. The present invention provides a system and method for a near-optimal utilization of licenses by appropriately distributing the demands over a period of time. The invention advantageously uses the project schedules and open demands to achieve a near-optimal license utilization.

One aspect of the invention is to provide a method for managing user profile and user interactions to create individual work and training plans, and use SWPs.

Another aspect of the invention is to provide a method for creating and modifying work project and training project plans.

Yet another aspect of the invention is to provide a method for an analysis of work project plans for training requirements.

Yet another aspect of the invention is to provide a method for an analysis of the usage of SWPs. Another aspect of the invention is to provide a method for an analysis of open, closed, and ad hoc demands for resources.

Yet another aspect of the invention is to provide a method for weekly and daily scheduling of work related demands, automatically scheduling training related demands, and planning procurement of licenses.

Yet another aspect of the invention is to provide a method for tracking events in real-time, usage costing, and user credibility analysis.

BRIEF DESCRIPTION OF THE DRAWINGS

FIG. 1 describes the system architecture of SLAS system.

FIG. 2 depicts the network architecture related to SLAS system.

FIG. 2A depicts the various database tables that are part of SLAS system.

FIG. 3 describes the steps involved in user profile management.

FIG. 4 describes the steps involved in login/logout management.

FIG. 5 depicts the steps involved in individual work planning.

FIG. 6 depicts the steps involved in individual training planning.

FIG. 7 describes the various phases of work planning.

FIG. 7A depicts the main contents of a work plan.

FIG. 7B describes the steps involved in the processing of a work plan.

FIG. 7C describes the steps involved in the analysis of a work plan.

FIG. 8 describes the various phases of training planning.

FIG. 8A depicts the main contents of a training plan.

FIG. 8B describes the steps involved in the processing of a work plan.

FIG. 8C describes the steps involved in the analysis of a training plan.

FIG. 9 describes the steps involved in the analysis of training requirements.

FIG. 10 describes the steps involved in usage analysis.

FIG. 11 describes the steps involved in resource demand analysis for an SWP.

FIG. 11A describes the steps involved in the analysis of dependency trees.

FIG. 12 describes the steps involved in weekly and daily scheduling.

FIG. 12A describes the steps involved in automated training scheduling.

FIG. 12B describes the steps involved in procurement planning.

FIG. 13 describes the steps involved in processing the login event related to the real-time usage tracking.

FIG. 13A describes the steps involved in processing logout and timer events.

FIG. 14 describes the steps involved in usage costing.

FIG. 15 describes the steps involved in credibility analysis.

DETAILED DESCRIPTION OF THE PREFERRED EMBODIMENTS

FIG. 1 depicts the system architecture of SLAS system (100) as consisting of three subsystems, namely, User Management subsystem, Plan Management subsystem, and License Usage Management subsystem. The main objectives of the SLAS system are: to appropriately allocate licenses of software packages (SWPs) to the demanding users to carry out their work using the software packages, to appropriately allocate licenses of software packages to the demanding users to get trained on the software packages, to maximally utilize the available licenses of software packages by automatically scheduling training and open sessions, and to analyze the demands on software packages to arrive at a procurement plan of annual, monthly, and hourly licenses of the software packages.

Typically, an enterprise deploys multiple SWPs and uses them on need basis. These SWPs are server-based and the licenses of these SWPs are managed by a network-based licensing manager. Distinct multiple kinds of licenses are procured for each SWP and it is essential to ensure that these licenses are put to best use. An average low utilization of an SWP and a bursty peak demand requires a large number of licenses to meet the user demands. A good demand distribution to contain the bursty demands and smoothen the average demand reduces the overall SWP inventory cost. SLAS keeps track of the number of licenses of an SWP available at any point in time and suggests the best possible time to schedule the usage of the SWP so as to minimize the unused hours of the SWP. In order to effectively keep track of the utilization of SWPs, the enterprise working hours are divided into smaller units called as slots. The duration of a slot is configurable and typically, it is about fifteen minutes. SLAS allocates licenses to the demanding users for a duration that is an integral multiple of slot duration. In order to systematically obtain the demands for the SWPs, SLAS connects seamlessly with the project planning software used by the managers of the enterprise. When a manager uses the project planning software to plan on the various activities related to a project, a line item in such a project plan is the identification two distinct kinds of resources: one is the identification of one or more human resources (also referred to as users), and second is the identification of an SWP that is required to be used by these human resources to perform the task mentioned in the plan. It is most appropriate to capture this demand of one or more licenses of the SWP for a pre-defined duration in order to achieve a good demand distribution.

As more and more SWPs, and newer versions of the existing SWPs get added to the software inventory of the enterprise, it becomes necessary to train the users on these new SWPs and the new features of the SWPs. Managers plan training programs to ensure that their team members are adequately skilled in the SWPs of interest to them. Similar to the project plan, a managers uses the project planning software to describe the training plans. A line item in such a plan is the identification of the users and the appropriate number of licenses of SWPs for the required duration with a clear start date/time and end date/time. SLAS captures this requirement to in order to achieve a good demand distribution.

There are three kinds of demands that SLAS system addresses, namely, closed demand, open demand, and ad hoc demand. Closed demands are the planned demands and these demands are captured during project planning phase. As project plans get revised periodically, SLAS system revises the demand for various SWPs based on the changes in the project plans. The other important characteristics of the closed demands are that these demands are frozen, at least temporarily, with respect to date and time enabling a better analysis of the demands. Open demands, on the other hand, indicate non-project, individualistic demands to use SWPs. Some of the users are keen to carry out additional, exploratory work to improve their skills in efficiently using the advanced features of the SWPs. While such open demands need to be met, there is no strict date/time constraints and this aspect is exploited by SLAS system in maximizing the usage of the SWPs. Ad hoc demands are non-planned demands to meet emergency situations. SLAS addresses such demands by prioritizing and accommodating the demands and reallocating the licenses to handle high priority, ad hoc demands.

The software inventory consists of multiple SWPs and their associated licenses. There are three distinct kinds of licenses, namely, annual licenses, monthly licenses, and hourly licenses. One of the objectives of SLAS system is to reduce the overall inventory cost by procuring an appropriate number annual, monthly, and hourly licenses. It is a matter of fact that annual licenses are cheaper than monthly licenses and the monthly licenses, in turn, are cheaper than hourly licenses. SLAS system analyzes the demand and utilization patterns to compute the number of various kinds of licenses required. Further, ad hoc demands are also addressed by procuring hourly licenses on just in time basis.

The individuals who are part of SLAS system play different kinds of roles: "user" role, "manager" role, and "administrator" role. The individuals who play the "user" role are called as users and these users use the SWPs to carry out the assigned work. The individuals who play the "manager" role are called as managers and these managers assign work to users. The individuals who play the role of "administrator" is called as administrators. User Management subsystem (105)

manages the interactions of users with SLAS system. The users are registered into the system and from then on, SLAS manages the needs of the users in accessing SWPs. Work gets assigned to the users by their managers and the users access the required SWP by logging into SLAS system. On completion of the work or if the allotted time gets completed, the users log out of SLAS system. SLAS system keeps track of the logged in users with respect to their allotted time and warns them appropriately when the allotted time is about to expire. User's profile indicates any restrictions applicable with respect to the accessing of the SWPs, access time and duration restrictions. The users plan their non-project related work and interact with SLAS system to submit their such needs. These open demands indicate the preferred time and the required total number of hours of access. The users also change their open demands to indicate the changes to the already made open demands including withdrawal of the same. SLAS system notifies the users about their allotment against the open demands. Even though the initial allotment is for a certain duration, SLAS system sends a short closure message and requesting the users to log out at the end of current or next immediate slot. Also, the users plan on their training requirements (again, non-project related) and interact with SLAS system to convey the same.

Plan Management subsystem (110) manages the interactions of managers with SLAS system. Managers interact with SLAS to create work plans and training plans. Mangers use their familiar planning software to plan on the tasks and users to execute these tasks. SLAS seamlessly integrates with such a planning software to capture work and training related needs to access SWPs. SLAS system analyses the work and training demands, and obtains a consolidated demand from multiple managers for the various SWPs. SLAS system also analyses the work plan and the overall demand to determine any training requirements for any of the users mentioned in the work plans. For this purpose, the system keeps track of all the scheduled training sessions with respect to the various versions of various SWPs and determines automatically any of the training needs. The system performs the usage analysis to determine the extent of use of the various SWPs by the various users and computes the following: hits, misses, delayed starts, early closures, and denials. A hit indicates that the user logged in on time and logged out as scheduled. A miss indicates the user didn't log in at the scheduled time. A delayed start indicates the user logged in late into the system while an early closure indicates that the user logged out earlier to the scheduling closing time. Finally, a denial indicates that due to high priority ad hoc requests, a user request is rejected. These counts are use to build in fairness in processing the requests from the users.

License Usage Management subsystem (115) maximizes the utilization of the available licenses of the various SWPs. This subsystem analyses open, closed, and ad hoc demands to access SWPs and tries to balance the demand across various slots. The system, where appropriate, combines, splits, and shifts demands, in consultation with the managers, to avoid bursty demands. As planned demands can change over time, the system performs weekly and daily analysis of demands to schedule and reschedule the usage of the SWPs by the various users. During demand analysis, the system makes use of open and ad hoc demands meaningfully in arriving at a best possible weekly and daily schedules. The system analyses the direct and indirect training demands to generate an appropriate training schedule. Direct demand refers to the planned training requests from the managers and the users while the indirect demand refers to the system identified training requirements.

In order to meet successfully the various kinds of demands, the system analyses these demands and usages to identify an optimal mix of annual, monthly, and hourly licenses. Also, as regards to hourly licenses, the system interacts online with vendors to obtain the required licenses "just in time." Usage tracking involves keeping track of users' log in/log out events to have an up-to-the-minute account of license availability. This helps in making best use of early closures and address effectively late closures. On log out, the system determines the duration of usage of an SWP by a user and computes the usage cost by using the factors such as day of usage, time of usage, duration of usage, nature of usage, and nature of the SWP. Usage tracking also helps in determining a usage pattern of user and predict the user behavior patterns as one of on time, early start, late start, early close, late close, and frequent miss. This predicted pattern is used to adjust the demand request to accommodate ad hoc and excessive demands.

FIG. 2 depicts the network architecture related to SLAS system. The main elements in the network architecture are SLAS System (server component), SLAS System (client component), and SWP repository. SLAS Server Component (200) implements the Plan Management and License Usage Management subsystems. There are multiple SLAS Client Components (202) that implement User Management subsystem. SWP repository (204) stores the various software packages and, based on need and demand, a required SWP is launched. In order to facilitate real-time interaction among these components and subsystems, the respective computer systems are interconnected using Ethernet. SLAS System (server component) is connected to SWP vendors (206) through a secured IP network. This network interconnection allows SLAS System to interact with SWP vendors in real-time to procure just in time hourly licenses and other kinds of licenses.

FIG. 2A depicts the various database tables that are part of SLAS system. 205 describes the database table related to login information. 210 describes the table related to user information. List of SWPs indicates the access is allowed only to the SWPs mentioned in the list. Further, if there non blank entries under the columns, Access Time and Access Duration, the access to the SWPs is allowed only during the mentioned Access Time with a duration limited by the mentioned Access Duration. User Information (215) also consists of details such as hours worked and trained so far on an SWP, last version of SWP used, expected usage of the SWP for working purposes and for training purposes. SWP database (220) consists of information related to a SWP such as its version number, date of installation, and number of distinct kinds of licenses. Usage related database (225) consists of information such as number of allotted and utilized licenses for each SWP and for each slot.

FIG. 3 describes the steps involved in user profile management. A user profile consists of information about the user such as date of registration into the system (302), role, list of allowable SWPs (with blank indicating access to all), and access time and duration restrictions. User Management subsystem obtains these information (304), validates the information for consistency, and updates User Information database (306). The user profile information is modified based on the need and the modified information updated onto User Information database.

FIG. 4 describes the steps involved in login/logout management. Users login to the system to interact and carry out the various activities (402). On user login, the system gets the user profile from the user information database (404). In step 406, the system determines the user's role. If the user's role is administrator, then the user performs the administration related activities such as the generation of various reports (408). On the other hand, if the role of the user is manager, then the user, based on need, performs work planning to create or modify a work project plan (410) or performs training planning to create or modify a training project plan (412). If the role of the user is to use the system to interact with SWPs, the system determines the nature of interaction (414). If the operation is to access SWP, the system determines the allowed SWPs and checks about the access time restrictions (416). Based on the work or training plan and allowable list of SWPs for the user, the system allows the user to use the chosen SWP (418). On the other hand, if the user likes to plan for working, then the user uses the appropriate interfaces of the system to perform individual work planning (420). Otherwise, if the user would like to plan for getting trained on an SWP, then the user uses the appropriate interfaces of the system to perform individual training planning (422). After the completion of the planned activities, the user logs out of the system (424). The system updates the usage information database (426).

FIG. 5 depicts the steps involved in individual work planning. Most of the user interactions with the SWPs are based on work or training project plan. Occasionally, however, users would like to interact with the system outside these planned activities. These kinds of interactions related to work is termed individual work planning. In order to maximize the utilization of licenses, the individual work planning requests are inputted as open demands. An open demand mentions the SWP of interest and duration indicating how long the user would like to interact with the system. It also mentions the period within which the user would like to complete the usage of the SWP. The system plans to allocate the time slots for such open demands in such a way as to achieve a good load distribution. User logs into the system and chooses individual work planning option (504). If, further, the user chooses to create a new open demand request for an SWP (506), user inputs the required information related to the open demand (508). System validates the input based on user profile and checks whether the inputted SWP and duration are appropriate (510). If the input information is not appropriate (512), the system displays the allowable SWPs and the duration enabling the user to input the correct information (514). On the other hand, if the input information is appropriate (512), the system checks whether there is an OD with respect to the selected SWP (518). If yes (520), the system informs the user about the existing OD (522). On the other hand, if there is no pending OD for the selected SWP (520), the system updates the usage information with the new OD request (524). If the user chooses to modify an existing OD (506), the system displays the existing ODs related to the user (526). The user selects and modifies an OD (528) and the usage information database is appropriately updated (524). On the other hand, if the user would like to delete an OD (506), the system displays the existing ODs related to the user (530). The user selects an appropriate OD (532) and deletes the same (534). The usage information database is updated to reflect the deletion (524).

FIG. 6 depicts the steps involved in individual training planning. In order to maximize the utilization of licenses, the individual training planning requests are inputted as open demands. An open demand mentions the SWP of interest and duration indicating how long the user would like to interact with the system. It also mentions the period within which the user would like to complete the usage of the SWP. The system plans to allocate the time slots for such open demands in such a way as to achieve a good load distribution. User logs into the system and chooses individual work planning option (604). If, further, the user chooses to create a new training demand request for an SWP (606), user inputs the required information related to the training demand (608). System validates the input based on user profile and checks whether the inputted SWP and duration are appropriate (610). If the input information is not appropriate (612), the system displays the allowable SWPs and the duration enabling the user to input the correct information (614). On the other hand, if the input information is appropriate (612), the system checks whether there is a training demand with respect to the selected SWP (618). If yes (620), the system informs the user about the existing training demand (622). On the other hand, if there is no pending training demand for the selected SWP (620), the system updates the usage information with the new training demand request (624). If the user chooses to modify an existing training demand (606), the system displays the existing training demands related to the user (626). The user selects and modifies a training demand (628) and the usage information database is appropriately updated (624). On the other hand, if the user would like to delete an existing training demand (606), the system displays the existing training demands related to the user (630). The user selects an appropriate training demand (632) and deletes the same (634). The usage information database is updated to reflect the deletion (624).

FIG. 7 describes the various phases of work planning. There are three main phases in work planning, namely, plan creation, plan analysis, and plan confirmation (700). When a plan is created, availability of the required licenses is checked and unallocated licenses are marked as blocked to indicate that these licenses are likely to be used. In the next phase, plan analysis is carried out and during this phase an attempt is made to distribute the load due to the plan being analyzed as much across as possible to facilitate better license utilization. The status of license utilization is changed from being "blocked" to being "planned." In the final phase, plan is further analyzed to confirm allocations and the status of license is changed from being "planned" to being "firm."

FIG. 7A depicts the main contents of a work plan. A work plan largely defines multiple WUs and describes dependencies among these WUs (705). Each described WU is bound with a set of users using an SWP for a specified duration.

FIG. 7B describes the steps involved in the processing of a work plan. In step 710, manager uses a project planning software to create a WP plan. The creation or modification of a WP plan involves the creation or modification of the WUs using the project planning software (712). For each WU, the manager assigns one or more users and an SWP that the users have to use to complete the assigned task (714). In step 716, manager inputs the required time slot (T) and duration (D) that provides the information about the starting date and time, and the ending date and time. The system analyses the inputted WU and splits the same into as many AWUs as possible, each AWU with the attributes of a set of users, an SWP, start time slot, and end time slot that are derived from the attributes of the WU. For each AWU, the system determines the availability of the licenses of the associated SWP (720) and if available (722), the system updates the usage information database with blocked WL allocation of the SWP. On the other hand, if the licenses are not available (722), then the system updates the usage information with license not being available (728). If there are more WUs to be defined or modified (726), the system performs from step 712 onwards.

FIG. 7C describes the steps involved in the analysis of a work plan. The analysis is carried out to fine tune the work plan to achieve a better distribution of load across multiple time slots and days and is based on underlying dependency tree analysis. In step 750, WP is analyzed to construct one or more dependency trees with the roots of the dependency trees denoting AWUs with no dependencies. For each dependency tree (D), the steps 754 through 776 are performed (752). The nodes in D from its root are analyzed and let N be the current node for which WL is not available (754). Determine the attributes of N, namely, SWP, start time slot, end time slot, and the number of users (756). It is required to shift the start time slot to new slot such that dependency constraints are not violated and WL availability is assured. Determine shift tolerance based on neighborhood dependency (758). In one of the preferred embodiments, this is achieved by analyzing the time slots of the nodes on which N depends and the nodes that dependent on N. For each user, the steps 762 through 772 are performed (760). The user data is analyzed to determine the characteristic usage pattern and this pattern is used to readjust the time slots (762). This is an optimistic planning to maximize license utilization. The readjustment also ensures that license availability due to early closures and license demands due to late closures are being anticipated and have been suitably addressed. A check is made to determine whether it is possible to shift the time slots within shift tolerance in such a way that the user is free during the shifted time slots (764). If so (766), update usage information database and inform manager to modify suitably the WP plan (768). If there are still some users yet to be analyzed (770), then the next user is determined (772) and the processing continues from the step 762. On the other hand, if there are no more users (770), a check is made to determine if there more nodes in D yet to be analyzed (774). If so (774), the next node N is determined (776) and the processing continues from the step 756 onwards. On the other hand, if there are no more nodes (774) and the processing of all the dependency trees is completed, then WP analyzed to automatically generate training schedules (778).

FIG. 8 describes the various phases of training planning. There are three main phases in training planning, namely, plan creation, plan analysis, and plan confirmation (800). When a plan is created, availability of the required licenses is checked and unallocated training licenses are marked as blocked to indicate that these licenses are likely to be used. The system handles two distinct kinds of licenses, namely, Training Licenses and Work Licenses. In the next phase, plan analysis is carried out and during this phase an attempt is made to distribute the load due to the plan being analyzed as much across as possible to facilitate better license utilization. The status of license utilization is changed from being "blocked" to being "planned." In the final phase, plan is further analyzed to confirm allocations and the status of license is changed from being "planned" to being "firm."

FIG. 8A depicts the main contents of a training plan. A training plan largely defines multiple TUs and describes dependencies among these TUs (805). Each described TU is bound with a set of users using an SWP for a specified duration.

FIG. 8B describes the steps involved in the processing of a work plan. In step 810, manager uses a project planning software to create a TP plan. The creation or modification of a TP plan involves the creation or modification of the TUs using the project planning software (812). For each TU, the manager assigns one or more users and an SWP on which the users get trained (814). In step 816, manager inputs the required time slot (T) and duration (D) that provides the information about the starting date and time, and the ending date and time. The system analyses the inputted TU and splits the same into as many ATUs as possible, each ATU with the attributes of a set of users, an SWP, start time slot, and end time slot that are derived from the attributes of the TU (818).

For each ATU, the system determines the availability of the training licenses of the associated SWP (820) and if available (822), the system updates the usage information database with blocked TL allocation of the SWP. On the other hand, if the licenses are not available (822), then the system updates the usage information with license not being available (828). If there are more TUs to be defined or modified (826), the system performs from step 812 onwards.

FIG. 8C describes the steps involved in the analysis of a training plan. The analysis is carried out to fine tune the training plan to achieve a better distribution of load across multiple time slots and days and is based on underlying dependency tree analysis. In step 850, TP is analyzed to construct one or more dependency trees with the roots of the dependency trees denoting ATUs with no dependencies. For each dependency tree (D), the steps 854 through 868 are performed (852). The nodes in D from its root are analyzed and let N be the current node for which TL is not available (854). Determine the attributes of N, namely, SWP, start time slot, end time slot, and the number of users (856). It is required to shift the start time slot to new slot such that dependency constraints are not violated and TL availability is assured. Determine shift tolerance based on neighborhood dependency (858). In one of the preferred embodiments, this is achieved by analyzing the time slots of the nodes on which N depends and the nodes that dependent on N. A check is made to determine whether it is possible to shift the time slots within shift tolerance in such a way that the user is free during the shifted time slots (860). If so (862), update usage information database and inform manager to modify suitably the TP plan (864). A check is made to determine if there more nodes in D yet to be analyzed (866). If so, the next node N is determined (868) and the processing continues from the step 856 onwards.

FIG. 9 describes the steps involved in the analysis of training requirements. The objective is to analyze a WP plan to determine the extent of training required for the users who are part of the WP plan (902). For a given WP, determine the users who are part of the WP plan (904). For each such user, perform the steps 908 through 932 (906). Identify the multiple SWPs that the user is expected to use (908). For each such SWP, perform the steps 912 through 932 (910). Determine the current version ($V_C$) of the SWP (912). Determine the last version ($V_T$) of the SWP that the user has been trained on (914). Determine the last version ($V_W$) of the SWP that the user has worked on (916). Check whether $V_C$ and $V_T$ differ in major version number (918). An SWP version is identified by a version number that is a combination of major and minor version numbers and change in major version number indicates a substantial revision to the SWP. If $V_C$ and $V_T$ do not differ in the major version number, then no training session is automatically scheduled. On the other hand, if they do differ (918), a check is made to determine if $V_W$ is less than or equal to $V_T$ that is less than $V_C$ (920). In other words, a check is made to determine whether the user working knowledge is restricted to an older version and the user had gotten trained on a later version. If it is not so, then no training session is automatically scheduled. On other hand, if it is so (920), determine the hours of online training required (922). Divide these hours into ATUs (924). Determine the time slots when the user is free (926). Determine the available TLs (928). For each ATU, schedule a training program based on the availability (930). Update the user and usage databases and inform the user and the user's manager regarding the training sessions (932).

FIG. 10 describes the steps involved in usage analysis. For a given WP plan, user, and SWP, determine the user's characteristics (1002). The objective is to determine the characteristics behavior of the user with respect to an SWP in terms of early/late logins and early/late closures and use the same is for readjusting the demanded duration to use the SWP. Determine the allotted time slots of the SWP for the user (1004). Determine the actual login and logout time slots (1006). Find the expected difference ($D_S$) between the allotted start and actual start time slots (1008). Find the expected difference ($D_D$) between the allotted end and actual end time slots (1010). Add $D_S/2$ to the planned start time (1012) and subtract $D_E/2$ from the planned end time (1014). This readjustment helps in maximizing the license utilization and avoiding unforeseen demands by exploiting the expected user behavior. Finally, update the usage information database (1016).

FIG. 11 describes the steps involved in resource demand analysis for an SWP. There are three different kinds of demands handled by the system, namely, open demands, closed demands, and ad hoc demands. Open demands are the demands that do not have a strict date/time requirement and closed demands the demands that have strict date/time requirements due to explicit dependencies. Ad hoc demands are unplanned demands with a strict date/time requirements. Steps 1104 through 1114 describe the open demand analysis (1102). For each OD, the steps 1106 through 1114 are performed (1104). Let D be the OD interval and E be the elapsed time, that is, time difference between current time and the start time of the OD (1106). Also, let R be the requested hours and S be the satisfied hours. Based on D, E, R, and S, compute ODF (1108). ODF indicates a sensitivity in handling ODs. In a preferred embodiment, ODF is computed so as to distribute the load equally across the weeks of D. Further, ODF computation can also account for the demand for the SWP during the coming week. A check is made to determine whether ODF is greater than or equal to a threshold (1110). If so, determine S' such that S'>S and ODF becomes less than the threshold (1112). S'−S needs to be scheduled during the coming week (1114). If it is not so (1110), there may not be a need to schedule time slots to meet this OD. Steps 1132 through 1140 describe the closed demand analysis (1130). Perform the steps 1132 through 1140 for al WP plans (WP based analysis) and for all TP plans (TP based analysis). For each SWP, construct a matrix depicting slot-wise demands by users (1134). Determine critical slots with total demand exceeding the availability during next week (1136). If there are critical slots (1138), perform week-specific decision tree analysis (1140). Otherwise (1138), there is no need to undertake any analysis as sufficient licenses are available to meet the demand.

Steps 1152 and 1154 describe the ad hoc demand analysis (1150). For each project, determine the total planned demand and ad hoc demand (1152). Based on total planned demand, total ad hoc demand, project priority, and total demand to be next week, determine the revised priority for the ad hoc demand request during the next week (1154). This revised priority is used in weekly scheduling to allocate licenses to the demands.

FIG. 11A describes the steps involved in the analysis of dependency trees.

Steps 1162 through 1180 describe the steps involved in week-specific decision tree analysis. Construct partial dependency trees corresponding to the next week for all the projects (1162). Construct partial demand matrix for the next week for all projects and determine critical slots (1164). For each critical slot, perform the steps 1168 through 1180 (1166). Determine AUs that are active in the critical slot (1168). AUs are either AWUs if the analysis is being performed for WP plans or are ATUs if the analysis is being performed for TP plans. Order AUs based on minimum left/right shift required and shift tolerance (1170). Select AU from top of the list (1172). Adjust the slots depending on user availability (1174). Check for the existence of criticality (1176). If still critical, that is, total demand is in excess of availability, then check whether there are AUs yet to be adjusted (1180). If so, the processing continues from the step 1172 onwards.

FIG. 12 describes the steps involved in weekly and daily scheduling. Steps 1202 through 1246 describe the details of usage scheduling (1200). There are two different types of scheduling activities performed at different frequencies, namely, weekly and daily scheduling activities. Weekly scheduling is performed once a week while daily scheduling performed once a day. Weekly scheduling is used to confirm open and closed requests while daily scheduling helps to account for the changes in the plan.

Steps 1204 through 1224 describe the process of weekly scheduling (1202). For each SWP, the steps 1206 through 1222 are performed (1204). Construct a demand matrix of users and time slots with different kinds of demands such as open, closed, and ad hoc demands (1206). Determine the critical slots in the demand matrix (1208). For each critical slot, perform the steps 1212 through 1222 (1210). Identify the projects and users who are part of the slot (1212). Arrange demands based on project priority and the user's CF in a non-decreasing order (1214). Based on excess demand, project priority, and CF, determine the derived demand (1216). In a preferred embodiment, the determination of derived demand involves reducing the demands of low priority projects by a certain fraction and reducing the demands of users with low CF by a certain fraction. Such a reduction is based on the expected behavior of users and leads to an optimistic scheduling. Note the above reduction is used only to compute the overall demand and is not communicated to the managers and users. Check if the derived demand exceeds the total availability (1218). If so, identify users who are on the top of the ordered list and do a best possible adjustment including negotiation for a new time slot that is relatively less loaded (1220) and the steps 1212 through 1220 are repeated for all the critical slots (1222). If it is not so (1218), the steps 1212 through 1220 are repeated for all the critical slots (1222). Finally, communicate the confirmed schedule to the managers (1224).

Steps 1232 through 1246 describe the process of daily scheduling (1230). For each SWP, the steps 1234 through 1246 are performed (1232). Construct a demand matrix of users and time slots with different kinds of demands such as open, closed, and ad hoc demands (1234). Determine the critical slots in the demand matrix (1236). For each critical slot, perform the steps 1240 through 1246 (1238). Identify the projects that are part of the slot (1240). Arrange demands based on project priority in a non-decreasing order into a list (1242). Identify a minimum number of demands from top of the list and remove their demands from the overall demand such that the criticality disappears, that is, the total demand is less than or equal to the availability and for these demands, update the usage information with "negotiate" (1246). Marking a demand with "negotiate" indicates that on user login, the system negotiates with the user for a possible shifting of the slot.

FIG. 12A describes the steps involved in automated training scheduling.

Steps 1252 through 1278 describe the process of automatic training scheduling (1250). A training demand is of different kinds: Open, Closed, and Auto. In an open training demand, the demand indicates an SWP, duration of training, and a period within which the training is required to be completed.

A closed demand, on the other hand, describes a planned training activity for a batch of users. Further, the planned activity also mentions about the usage of an SWP during a scheduled time period. The TP plan also indicates the dependencies among the various training sessions spread over an interval (1252). The automatic training scheduling is performed once a week immediately after weekly scheduling of WLs (1254). For each SWP and for each day of week, perform the steps 1258 through 1276 (1256). Determine the expected utilization and find our lean and heavy slots (1258). Lean slots are those slots that have least expected demand while heavy slots are expected to have high demand. Determine the number of WLs that can be converted into TL (1260). Construct a demand matrix with respect to users and slots (1262). Analyze the training demands; there are three categories of training demands, namely, open, closed, and auto (1264). Auto demands are those training requests that are automatically generated by the system during WP plan analysis. As for as scheduling is concerned, these auto requests are treated as similar to open demands. Determine the free time slots of the users (1266). Fill in the demand matrix in a best possible way (1268). This filling in step makes use of the free slots of the users and "lean-ness" of the slots. Determine the critical slots based on the availability of TLs (1270). If critical slots exist (1272), reduce the overall demand by eliminating demands in the order of auto, open, and closed demands (1274). The processing continues from the step 1256 onwards. Finally, communicate users and managers about the confirmed training schedule (1278).

FIG. 12B describes the steps involved in procurement planning.

Steps 1280 through 1297 describe the process of license procurement. Step 1282 describes the procurement of hourly licenses (1281). Hourly licenses are procured just in time to meet the excess and ad hoc demands (1282). This is achieved by communicating with license providers in real-time over the network. Steps 1285 through 1280 describe the process of migrating to monthly and annual licenses (1283 and 1284). Analyze the procured hourly/monthly licenses (1285). Determine the pattern of procurement (1286). Determine the portion of month/year covered by these procurements (1287). If the portion does cover a substantial part of a month/year (1288), then some of hourly/monthly licenses are released to acquire monthly/annual licenses. Such a migration is undertaken as annual licenses are relatively cheaper than monthly licenses that in turn are cheaper than hourly licenses. Hence, from the overall cost point of view, it is better to have more annual and less of hourly licenses, and aim for better utilization of these licenses. The proposed invention suggests an approach for achieving this better utilization of SWP licenses. Steps 1292 through 1296 describe the process of migrating to monthly and hourly licenses (1290 and 1291). Analyze the utilization of annual/monthly licenses (1292). Determine the pattern of usage (1293). Determine the portion covered by the utilization over a year/month period. If the portion covers only a small portion of the period (1295), the some of annual/monthly licenses are released and additional monthly/hourly licenses are procured (1296). Step 1297 describes the release of hourly licenses of an SWP (1296). Licenses expire at the end of the allotted period and are not further usable (1297).

FIG. 13 describes the steps involved in processing the login event related to the real-time usage tracking. Steps 1304 through 1336 describe the processing of login event (1302). On event user login, determine allotted time slot for the logged in user (1304). Check to determine if the nature of demand is ad hoc (1306). If it is not ad hoc login, compare the allotted time slot and login time slot (1308). If the user had logged in on-time or has logged in late, check for the availability of licenses (1310). If license is available (1312), update usage and SWP information (1314). On the other hand, if license is not available (1312), determine the nature of demand, project priority, and user CF (1316). Check if any late close sessions can be short closed after notification; also check if hourly license needs to be procured; and if training session, check if WL is available and can be used for training purpose (1318). Based on the above factors, determine whether login can be allowed (1320). If so, update usage and SWP information (1314). If not, determine expected logouts in the next immediate slot that can be used to allow the current login (1322) and determine whether to put on hold the logged-in user (1324). If so, add the user information to a priority queue (1326). Otherwise, negotiate with the user for an alternative slot (1328). On the other hand (1308), if the user had logged-in early, determine additional number of slots (1330). Check if license is available and there are no expected logins (1332). Determine whether login can be allowed (1334). If so, update usage and SWP information (1314). Otherwise, inform user and force logout (1336).

On the other hand (1306), if the current login is an ad hoc login, then the processing continues from the step 1316 onwards.

FIG. 13A describes the steps involved in processing logout and timer events. Steps 1352 through 1360 describe the handling of logout event (1350). On event logout, determine allotted time slot (1352). Update the usage and SWP information (1354). Check the priority queue and determine if the user at the head of the queue can be allotted the license (1356). If the user can be allowed to login (1358), then update the usage and SWP information (1360).

Steps 1364 through 1398 describe the steps involved in handling of timer event (1362). On timer event, analyze the demand and determine the number of licenses along with the period of availability (1364). Determine the users whose session closes in the current time slot (1366). For each such user, perform the steps 1370 through 1392 (1368). Determine the nature of login, project priority and user CF (1370). Determine whether the user can be given an extension taking into account entries in the priority queue (1372). If so (1374), send notification to check whether the user would like to extend the usage (1376). If the user would like to extend (1378), get extension time, validate and revise if necessary, and grant (1380). And, update the usage and SWP information (1382). On the other hand (1374), if the user session cannot be extended, then send notification to the user requesting for the session closure (1384). If the user needs an extension (1386), then determine whether this extension can be an exception based on project priority and CF. If the extension can be granted (1390), then the processing continues from the step 1380 onwards. Otherwise, send notification that the session will be force closed at the end of current time slot (1392).

On timer event (1362), analyze the entries in the priority queue (1394). Determine if any users are waiting for longer than a threshold number of slots (1396). If so, inform and force logout such user sessions (1398).

FIG. 14 describes the steps involved in usage costing. Steps 1404 through 1412 describe the processing involved in usage costing (1402). Usage costing is done whenever a logged-in user logs out (1404). On event logout, determine the following: SWP, nature of demand, total hours used, and extended hours, if any (1406). Costing is based on factors such as whether the usage was work or training project related, whether the demand was an open, closed, or ad hoc demand, and was there an ad hoc extension. Determine discount factor based on whether the user accommodated an extension or whether the demand was an open demand (1408). Compute usage cost based on rate/time slot and the above factors, and update the usage cost information (1410).

FIG. 15 describes the steps involved in credibility analysis. The credibility analysis is used to analyze the demand and usage patterns so that optimistic planning can be achieved. Steps 1504 through 1516 describe the credibility analysis of managers (1502). For each manager, perform the steps 1506 through 1516 (1504). For each project managed by the manager, perform the steps 1508 through 1514. Determine the frequency and quantum of changes to the project plan (1508). Determine the number of ad hoc demands (1510). Determine the number of ad hoc extensions (1512). Based on these factors, determine PCF (1514). Determine the MCF based on the PCFs associated with the projects managed by the manager (1516). Finally, update the user information (1534).

Steps 1522 through 1532 describe the credibility analysis of the users (1520). For each user, perform the steps 1525 through 1532 (1522). Determine the amount of early and late logins (1524). Determine the amount of early and late logouts (1526). Determine the number of misses (1528). Determine the average PCF of the projects of the user (1530). Based on these factors, compute UCF (15320. Finally, update the user information (1534).

Thus, a system and method for maximizing utilization of SWP licenses utilization based on a near-optimal distribution of demands by making use of project schedules and open demands has been disclosed. Although the present invention has been described particularly with reference to the figures, it will be apparent to one of the ordinary skill in the art that the present invention may appear in any number of systems that maximizes the utilization of SWP licenses. It is further contemplated that many changes and modifications may be made by one of ordinary skill in the art without departing from the spirit and scope of the present invention.

| ACRONYM LIST | | |
|---|---|---|
| 1. | ATU | Atomic Training Unit |
| 2. | AU | Atomic Unit |
| 3. | AWU | Atomic Work Unit |
| 4. | CF | Credibility Factor |
| 5. | MCF | Manager Credibility Factor |
| 6. | OD | Open Demand |
| 7. | ODF | Open Demand Factor |
| 8. | PCF | Project Credibility Factor |
| 9. | SLAS | Software License Allocation System |
| 10. | SWP | Software Package |
| 11. | TL | Training License |
| 12. | TP | Training Project |
| 13. | TU | Training Unit |
| 14. | UCF | User Credibility Factor |
| 15. | WL | Working License |
| 16. | WP | Work Project |
| 17. | WU | Work Unit |

What is claimed is:

1. A system for an effective distribution of a plurality of demands over a period of time for efficiently utilizing a plurality of licenses of a plurality of software packages to meet said plurality of demands based on a plurality of credibility factors associated with a plurality of managers, wherein said plurality of demands are assigned by said plurality of managers to a plurality of users based on a plurality of work plans and a plurality of training plans, and said period of time comprises a plurality of slots and said plurality of licenses comprises a plurality of open demand licenses, a plurality of closed demand licenses, a plurality of ad hoc demand licenses, and a plurality of training licenses, said system comprising:

means for computing said plurality of open demand licenses based on said plurality of work plans wherein each of said plurality of open demand licenses is part of said plurality of licenses of said plurality of software packages, wherein said means for computing said plurality of open demand licenses further comprises:

means for obtaining a plurality of open work demands, wherein each of said plurality of open work demands is a part of said plurality of demands;

means for obtaining an open work demand of said plurality of open work demands;

means for determining an interval based on said open work demand;

means for determining an elapsed time based on said open work demand; means for determining a number of requested hours based on said open work demand;

means for determining a number of satisfied hours based on said open work demand;

means for computing an open demand factor based on said interval, said elapsed time, said number of requested hours, and said number of satisfied hours; and means for determining a new number of satisfied hours wherein said new number of satisfied hours is greater than said number of satisfied hours;

means for computing a new open demand factor based on said interval, said elapsed time, said number of requested hours, and said new number of satisfied hours, wherein said new open demand factor is less than a pre-defined threshold;

means for computing a number of open demands to be scheduled during said period of time based on said number of satisfied hours and said new number of satisfied hours; and means for computing said plurality of open demand licenses based on said number of open demands;

means for computing said plurality of closed demand licenses based on said plurality of work plans wherein each of said plurality of closed demand licenses is part of said plurality of licenses of said plurality of software packages, wherein said means for computing said plurality of closed demand licenses further comprises:

means for obtaining a software package of said plurality of software packages;

means for determining a demand for said software package during a slot of said plurality of slots;

means for obtaining an availability of said software package during said slot;

means for checking if said demand exceeds said availability;

means for constructing a partial dependency tree for said period of time based on said plurality of work plans;

means for constructing a partial demand matrix for said software package for said period of time;

means for obtaining a critical slot based on said partial demand matrix, wherein a demand based on said partial demand matrix during said critical slot exceeds an availability of said software package during said critical slot and said critical slot is a part of said plurality of slots:

means for determining a plurality of atomic work units based on said critical slot;

means for determining a plurality of slot related working users associated with said critical slot; wherein each of said plurality of slot related working users is a part of a plurality of working users of said plurality of users;

means for determining a plurality of slot related projects associated with said critical slot based on said plurality of work plans;

means for computing a plurality of atomic work unit shift tolerances associated with said plurality of atomic work units based on said partial dependency tree, wherein an atomic work unit shift tolerance of said plurality of atomic work unit shift tolerances is associated with an atomic work unit of said plurality of atomic work units;

means for ordering of said plurality of atomic work units based on a minimum adjustment and a work unit shift tolerance associated with each of said plurality of atomic work units, a plurality of priorities associated with said plurality of slot related projects, and a plurality of credibility factors associated with said plurality of slot related users resulting in a plurality of ordered atomic work units;

means for computing a plurality of shift tolerances associated with said plurality of ordered work units based on said partial dependency tree, wherein a shift tolerance of said plurality of shift tolerances is associated with an ordered work unit of said plurality of ordered work units;

means for selecting an ordered atomic work unit from the top of said plurality of ordered atomic work units;

means for performing reassignment of said ordered atomic work unit to a slot of said plurality of slots based on a minimum adjustment, a shift tolerance associated with said ordered work unit, and availability of said plurality of slot related working users resulting in an updated slot of a plurality of updated slots; and means for computing said plurality of closed demand licenses based on said plurality of updated slots;

means for computing said plurality of ad hoc demand licenses based on said plurality of work plans wherein each of said plurality of ad hoc demand licenses is a part of said plurality of licenses of said plurality of software packages;

means for computing said plurality of training licenses based on said plurality of training plans, wherein each of said plurality of training licenses is a part of said plurality of licenses of said plurality of software packages; and means for computing a credibility factor of said plurality of credibility factors associated with a manager of said plurality of managers with respect to said plurality of demands.

2. The system of claim 1, wherein said means for computing said plurality of ad hoc demand licenses further comprises:

means for obtaining a plurality of ad hoc demands of said plurality of demands;

means for obtaining a project based on said plurality of work plans;

means for determining an ad hoc demand for said project, wherein said ad hoc demand is a part of said plurality of ad hoc demands;

means for determining a total planned demand with respect to said project;

means for determining a total ad hoc demand with respect to said project;

means for computing a revised priority for said ad hoc demand based on said total planned demand, said total ad hoc demand, and a priority of said project, wherein said revised priority is a part of a plurality of revised priorities for said plurality of ad hoc demands;

means for computing a plurality of revised ad hoc demands based on said plurality of ad hoc demands and said plurality of revised priorities; and means for computing a plurality of ad hoc demand licenses of said plurality of licenses based on said plurality of revised ad hoc demands.

3. The system of claim 1, wherein said means for computing said plurality of training licenses further comprises:

means for obtaining a software package of said plurality of software packages;

means for determining an expected utilization of a plurality of software package licenses of said software package, wherein each of said plurality of software package licenses is a part of said plurality of licenses;

means for determining a plurality of generic training units based on a plurality of open training demands of said plurality of demands, wherein each of said plurality of open training demands is part of said training plans, a plurality of closed training demands of said plurality of demands, wherein each of said plurality of closed training demands is part of said plurality of training plans, and a plurality of auto training demands of said plurality of demands, wherein each of said plurality of auto training demands is a part of said plurality of training plans and is automatically generated based on said plurality of work plans;

means for determining a plurality of available work licenses based on said expected utilization, wherein each of said plurality of available work licenses is a part of said plurality of licenses;

means for determining a plurality of available training licenses, wherein each of said plurality of available training licenses is a part of said plurality of licenses;

means for determining a total number of available licenses based on said plurality of available work licenses, and said available training licenses;

means for obtaining a plurality of training users of said plurality of users based on said plurality of generic training units and said software package;

means for constructing a demand matrix based on said plurality of training users and said plurality of slots;

means for scheduling of said plurality of training users based on said demand matrix and a plurality of available slots associated with said plurality of training users resulting in a plurality of allotted training licenses, wherein each of said plurality of available slots is a part of said plurality of slots;

means for determining a plurality of critical slots based on said total number of available licenses, wherein a license for said software package is not available during each of said critical slots;

means for ordering said plurality of generic training units with respect to said plurality of auto training demands, said plurality of open training demands, and said plurality of closed training demands resulting in a plurality of ordered generic training units;

means for reducing an overall demand based on said demand matrix and said ordered generic training units resulting in a plurality of revised training licenses; and means for computing said plurality of training licenses based on said plurality of allotted training licenses and said plurality of revised training licenses.

4. The system of claim 1, wherein said means for computing said credibility factor of said manager further comprises:

means for determining a plurality of projects associated with said manager based on said plurality of work plans;

means for obtaining a project of said plurality of projects;

means for determining a frequency of changes to said project;

means for determining a quantum of changes to said project;

means for determining a quantum of ad hoc demands with respect to said project;

means for determining a quantum of ad hoc extensions associated with said project;

means for computing a project credibility factor of said project based said frequency of changes, said quantum of changes, said quantum of ad hoc requests, and said quantum of ad hoc extensions; and means for computing said credibility factor of said manager based on a project credibility factor associated with each project of said plurality of projects.

* * * * *